(12) United States Patent
Chen

(10) Patent No.: US 11,526,726 B2
(45) Date of Patent: Dec. 13, 2022

(54) ARTIFICIAL-INTELLIGENCE DECISION-MAKING CORE SYSTEM WITH NEURAL NETWORK

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 353 days.

(21) Appl. No.: 16/932,863

(22) Filed: Jul. 20, 2020

(65) Prior Publication Data

US 2022/0004839 A1 Jan. 6, 2022

(30) Foreign Application Priority Data

Jul. 2, 2020 (TW) ................................. 109122440

(51) Int. Cl.
| | |
|---|---|
| *G06N 3/08* | (2006.01) |
| *G06N 20/00* | (2019.01) |
| *G06N 3/02* | (2006.01) |
| *G06N 3/063* | (2006.01) |
| *G06N 3/04* | (2006.01) |
| *G06F 16/22* | (2019.01) |
| *G06F 17/16* | (2006.01) |

(52) U.S. Cl.
CPC ............ *G06N 3/04* (2013.01); *G06F 16/2246* (2019.01); *G06F 17/16* (2013.01); *G06N 3/084* (2013.01); *G06N 3/086* (2013.01)

(58) Field of Classification Search
CPC .......... G06N 3/04; G06N 3/084; G06N 3/086; G06N 3/126; G06N 3/063; G06N 5/003; G06N 20/10; G06N 3/088; G06F 16/2246; G06F 17/16
See application file for complete search history.

(56) References Cited

U.S. PATENT DOCUMENTS

| | | | |
|---|---|---|---|
| 7,366,564 B2 * | 4/2008 | Szu ....................... | G06T 7/0012 600/473 |
| 9,646,243 B1 * | 5/2017 | Gokmen .................. | G06N 3/08 |
| 9,715,656 B1 * | 7/2017 | Gokmen .................. | G06N 3/08 |
| 2014/0012789 A1 * | 1/2014 | Bazhenov .............. | G06N 20/00 706/25 |
| 2017/0109628 A1 * | 4/2017 | Gokmen .................. | G06N 3/08 |

* cited by examiner

*Primary Examiner* — Brandon S Cole

(57) ABSTRACT

An artificial-intelligence decision-making core system with neural network implements asymmetric hidden layers which is constructed by neural network with a dynamic neuron adjusting mechanism via making use of a device with computing unit and storage media, coupled to an independent feedback sub-system which operates a residual-compensation mechanism, thereby the core system can receive various trained data and performs a non-linear analysis process according to the output data derived from the asymmetric hidden layers of an unsupervised neural network, so as to derive individual and applicable decision-making data.

12 Claims, 13 Drawing Sheets

ARTIFICIAL-INTELLIGENCE DECISION-MAKING CORE SYSTEM WITH NEURAL NETWORK

CROSS-REFERENCE TO RELATED APPLICATION

This non-provisional application claims priority under 35 U.S.C. § 119(a) on Patent Application No(s). 109122440 filed in Taiwan, R.O.C. on Jul. 2, 2020, the entire contents of which are hereby incorporated by reference.

BACKGROUND OF THE INVENTION

1. Field of the Invention

The present invention relates to a decision-making core system, and in particular, to an artificial-intelligence decision-making core system with neural network to dynamically adjust neuron nodes, make use of non-linear analysis processes, and couple residual-compensation mechanism, thereby the core system can support a variety of trained data with various properties to derive decision-making data with differentiation and applicability.

2. Description of the Related Art

At present, most of conventional artificial-intelligence decision-making systems are applied with a single type of neural-network topology, and the data structures adopted by the neurons arranged and configured in neural networks are usually traditional linear data structures.

However, the above-mentioned conventional decision-making system with the single neural network which adopts linear data structure for data training, usually derives non-distinguished training results. As expected, decision-making systems with similar neural-network topologies normally work in similar decision-making styles as well. It makes the decision-making system not readily to be applied to different scenarios, and cannot provide decision-making results with different variable dimensions or styles for advanced commercial applications. Moreover, it will degrade the effect of decision making due to worse reference and applicability of the decision-making results.

Even though there are already a few types of neural networks can provide decision-making technology with differentiation on the output results (such as DCIGN, LSM, SOMNN, etc.), once the topology of neural network is trained to fit data with certain features (such as financial data, human factors data, chess data, etc.), it is difficult to change the neural networks to apply to data with different features. Moreover, its data of decision-making results is also easy to be learned or analyzed by an external neural network to crack the topology structure of its neural network.

Therefore, it is desirable to have improvements in the approach to artificial-intelligence decision-making systems.

BRIEF SUMMARY OF THE INVENTION

In view of the drawbacks of the prior art, it is an object of the present invention to provide an artificial-intelligence decision-making core system with neural network, wherein the system can dynamically adjust neuron nodes, make use of non-linear analysis processes, and couple a residual-compensation mechanism, thereby the system can support a variety of trained data with various properties to derive individual and applicable decision-making data. The related technologies can be implemented as a device or an electronic system with reasonable cost, and can quickly adjust the topology of the neural network according to the specific requirements for decision-making data, while effectively avoids the defect of the prior art systems where their output data is easy to be learned or analyzed by external neural networks.

To achieve the above objects and more, the present invention provides a device or system to implement the decision-making core system. The present invention comprises an artificial-intelligence decision-making core system with neural network comprising: an unsupervised neural-network interface module, a neuro-computing sub-system, and a residual-backpropagation sub-system. The unsupervised neural-network interface module comprises at least a computing-and-storage device, wherein this device can be implemented as an input device such as a computing device to receive raw data, and an interface of this input device for receiving the raw data can be applied to a variety of trained data from external non-specific models (such as financial models, human behavior models, war chess models, etc.). The neuro-computing sub-system comprises at least a computing device integrated with or coupled to at least one storage device, wherein the sub-system is connected to the above-mentioned input device to perform pre-processing operations on the received raw data to obtain pre-processed data, wherein the pre-processing operations are performed in an asymmetric-hidden-layers input module within an embedded system, and then the pre-processed data is subjected to a neuron computing process that can dynamically update the neuron nodes, and then the neuro-computing sub-system is capable of deriving corresponding non-linear analyzed data and decision-making data, via a non-linear PCA (principle component analysis) computing process with assistance of Chaos models. The residual-backpropagation sub-system that can operate independently, coupled to the neuro-computing sub-system, is used for performing a residual compensation computing process based on the non-linear analyzed data to generate system tuning information and residual-feedback data, or training-breaker information, to facilitate the neuro-computing sub-system to derive individual and applicable decision-making data, wherein the system tuning information is coupled to the neuro-computing sub-system for modifying or adjusting the neural network, and the training-breaker information is coupled to the neuro-computing sub-system for performing a breaking mechanism for the training processes (hereinafter training-break mechanism) in the neural network, and the residual-feedback data is for facilitating the neuro-computing sub-system to derive or enhance decision-making data.

In an embodiment, the above-mentioned neuro-computing sub-system comprises: an asymmetric-hidden-layers input module, a tree-structured neuron module, a layered weight parameter module, a non-linear PCA module, and a tree-searching module. The asymmetric-hidden-layers input module is configured to perform a data pre-processing process on the raw data received from the unsupervised neural-network interface module, in asymmetric hidden layers formed with an unsupervised neural network, to derive pre-processed data, wherein the mentioned asymmetric hidden layer means that the bidirectional weights between neurons are not equal in such hidden layer. The tree-structured neuron module, connected to the asymmetric-hidden-layers input module, including a plurality of neuron-node data, is used for managing neurons of a neural network, wherein the module can perform a tree-structured data processing program based on the pre-processed data to generate tree-structured data corresponding to each neuron node, whereby the neuron nodes can be modified according to the system tuning information from the residual-backpropagation sub-system The layered weight parameter module, connected to the tree-structured neuron module, is configured to perform a layered weight parameter computing process according to the tree-structured data to obtain layered-weight parameter data for managing the specific weight of each hidden layer in the neural network, wherein it makes considering the factors of the layered weight parameter be necessary in addition to the weight parameters of individual neuron, for tuning the weight parameter of the neural network. The non-linear PCA module, connected to the layered weight parameter module, is configured to perform a non-linear PCA computing process based on the layered-weight parameter data to derive non-linear analyzed data, wherein the non-linear PCA module is configured to derive applicable decision-making data based on the non-linear analyzed data or work with the residual-feedback data from the residual-backpropagation sub-system for improving the decision-making data. The tree-searching module, coupled to the tree-structured neuron module and the residual-backpropagation sub-system, is utilized for breaking the neural-network training process at once to maintain the differentiation and the applicability of the decision-making data. Combining these elements in an implementation of software, hardware, or a combination of software and hardware as a neuro-computing sub-system can dynamically adjust neuron nodes to support various types of trained data, so that the unsupervised neural network with asymmetric hidden layers can export layered-weight parameter data covering multi-dimensional variables, and can also import applicable residual-compensation mechanism dynamically, whereby a set of data with non-linear multiple variables can be further eigenized through a non-linear PCA computing process based on the layered-weight parameter data, to make it practical to support various data types within a decision-making neural network. It is an effect that cannot be achieved by the prior art.

In order not to cause any misunderstanding or misleading in the following descriptions for the present invention, please notice that in the above embodiment, the non-linear PCA computing process is not based on the data derived from the output layer of a neural network. Instead, the non-linear PCA computing process is performed according to the data related to the layered weight of each hidden layer in a neural network. A legacy artificial-intelligence application usually treats the hidden layers as a black box within a neural network, but the present invention analyzes and eigenizes how the neural network makes decisions through the hidden layers. This technology idea is much progressive and creative from the conventional artificial-intelligence applications.

In an embodiment, in order to enhance the decision-making quality of the core system, the above-mentioned neuro-computing sub-system further comprises the following modules: a hidden-layered routing module, a dense data processing module, a sparse tensor processing module, a Chaos model analysis module, and a neuron dimension switching module. The hidden-layered routing module receives the raw data from the unsupervised neural-network interface module of the decision-making core system, and plans a route (e.g., a feasible route or so on) for the hidden layers according to the attributes of the raw data, so that the neuro-computing sub-system can support variable propagation paths for the hidden layers of the neural network dynamically. The dense data processing module analyzes the raw data from the unsupervised neural-network interface module of the decision-making core system and performs a dense data processing program for dropping invalid data if there is a high-density attribute with the raw data, after that normalizes the duplicate data, and then import the output data which is already completed by the dense data processing program, into the asymmetric-hidden-layers input module of the neuro-computing sub-system. The sparse tensor processing module, coupled to the tree-structured neuron module of the sub-system, analyzes the neuron nodes derived by the tree-structured neuron module to verify whether the neuron nodes fit the conditions of sparse tensor, wherein when the neurons fit the condition, the sparse tensor processing module performs a sparse-matrix operation process to facilitate computing performance and save system memory usage for the neural network. When the non-linear PCA module cannot make effective corrections according to the residual-feedback data received from the residual-backpropagation sub-system, the Chaos model analysis module, coupled to the non-linear PCA module of the sub-system, performs a Chaos model analysis process to facilitate the derivation of the decision-making data. The neuron dimension switching module, coupled to the tree-structured neuron module, performs a neuron-dimension switching process based on system tuning information from the residual-backpropagation sub-system, to facilitate the switching of the decision-making style, so that the neuron dimension switching module is capable of enhancing the differentiation and applicability of the decision-making data. Combining these elements in an implementation of software, hardware, or a combination of software and hardware into a neuro-computing sub-system can facilitate the derivation of the decision-making data and enhance the performance of derivation, and can make real-time decision-making in practice. This integration is much progressive from the prior art.

In an embodiment, the above-mentioned residual-backpropagation sub-system comprises: a progressive backpropagation input module, a system tuning module, and a progressive backpropagation output module. The progressive backpropagation input module is for receiving non-linear analyzed data from the above-mentioned non-linear PCA module of the neuro-computing sub-system. The system tuning module is configured to perform a residual compensation process for the non-linear analyzed data, to derive a feedback-tuning information, and to trigger a training-break mechanism of neural network according to the feedback-tuning information or deliver the feedback-tuning information. The progressive backpropagation output module, based on the updated state of the system tuning module and the derived feedback-tuning information, is configured to derive a residual-feedback data and send the residual-feedback data to the non-linear PCA module of the neuro-computing sub-system for facilitating the neuro-computing sub-system to maintain the differentiation and applicability of the decision-making data. Combining these elements in an implementation of software, hardware, or a combination of software and hardware as a residual-backpropagation sub-system not only improves the accuracy of the neural network training model, but also can effectively manage the distribution interval of decision-making data, and can also timely avoid the training model of the neural network being hacked by unsuitable external data. This integration is much progressive from the conventional technologies.

In an embodiment, in order to enhance the processing ability for non-linear analyzed data, so as to apply various non-linear analyzed data with different properties, wherein the residual-backpropagation sub-system further comprises: a dynamic-norm processing module, an inner-product processing module, a manifold operation module, a tensor switching module, a functional operation module, and an ARIMA-model processing module. The dynamic-norm processing module for non-linear analyzed data that can be vectorized or matrixed, can work with the progressive backpropagation input module of the residual-backpropagation sub-system to perform a pre-processing program to import the vectorized data or matrixed data to the system tuning module for operation of residual-compensation mechanism. In addition, if the non-linear analyzed data reveals that most of the layered weights are in a large scale, the progressive backpropagation input module of the residual-backpropagation sub-system can further coordinate the dynamic-norm processing module to perform a re-initialization process to implement a norm-penalty mechanism for the hidden layers to re-initialize the related weight parameters of the neural network for reducing possible overfitting. The inner-product processing module for vectorized data or matrixed data with image properties can work with the progressive backpropagation input module of the residual-backpropagation sub-system to perform another pre-processing program to self-define the relationship between nodes and vectors, so as to introduce standard orthogonal basis to the system tuning module to improve the operation of residual-compensation mechanism. The manifold operation module for non-Euclidean space data can work with the progressive backpropagation input module of the residual-backpropagation sub-system to perform another pre-processing program to switch the non-Euclidean space data into the form of Euclidean space, so as to import sampling data from various geometry spaces to the system tuning module to enhance the applicability of residual-compensation mechanism. The tensor switching module for time-variant data can work with the system tuning module of the residual-backpropagation sub-system to perform a self-correction process to switch the residual data already processed by residual-compensation mechanism through various dimensional spaces, so as to find the optimal residual-operation space that is most feasible for the time-variant data to enhance the applicability of residual-compensation mechanism. The functional operation module for a computing process of obtaining the optimal solution of loss function via making use of boosting algorithm can work with the system tuning module of the residual-backpropagation sub-system to perform a mathematical programming process with functional operations, to facilitate the derivation of the optimal solution of the loss function, so as to maintain the accuracy of the residual-compensation mechanism. The ARIMA-model processing module for non-stationary residual data can work with the system tuning module of the residual-backpropagation sub-system to perform a stationary process through integrated finite-difference operations to obtain a stationary residual data, so as to check whether the stationary residual data fits a white-noise sequence to confirm whether the original non-stationary residual data needs to be corrected. Combining these elements in an implementation of software, hardware, or a combination of software and hardware into a residual-backpropagation sub-system not only facilitates residual operation for data with various properties, but also can implement residual analysis from perspectives of different spaces, different dimensions and different time intervals, so as to provide a self-correction mechanism for residual data to avoid the improper residuals derived from artificial data destroying the training model of the neural network. This is an effect that cannot be achieved by conventional technology.

In an embodiment, the above-mentioned tree-structured neuron module of the neuro-computing sub-system comprises: a cross-neuron computing unit and a neuron-weight updating unit. The cross-neuron computing unit performs a neuron data updating process according to the residual-feedback data received by the neuro-computing sub-system from the progressive backpropagation output module of the residual-backpropagation sub-system, so as to generate corresponding neuron updating data. The neuron-weight updating unit performs another neuron data updating process according to the neuron updating data, so as to update the tree-structured data and the weight parameter data for the neurons of the neural network, and notify the asymmetric-hidden-layers input module to perform an updating process for the raw data in a pre-processing process. Combining these elements in an implementation of software, hardware, or a combination of software and hardware as a tree-structured neuron module not only provides the effect of real-time weight adjustment for the neural network, but also facilitates to dynamically adjust the neuron nodes of a neural network, so as to change its decision-making style in real time. This is an effect that cannot be achieved by conventional technology.

In an embodiment, in order to prevent being hacked or learned via external neural networks, the tree-structured neuron module of the neuro-computing sub-system further comprises: a neuron generator unit, a neuron topology switching unit, and a neuron grouping management unit. The neuron generator unit performs a neuron generating process according to the instructions from the tree-structured neuron module, so as to generate the required nodes for corresponding neurons. The neuron topology switching unit performs a neuron topology switching process according to the instructions from the tree-structured neuron module, working with the neuron generator unit, so as to dynamically change the topology structure of the neural network. The neuron grouping management unit performs a neural-network reorganizing process for neuron nodes with various attributes, according to the instructions from the tree-structured neuron module, working with the neuron topology switching unit, so as to dynamically combine multiple neural networks with different topology structures. Combining these elements in an implementation of software, hardware, or a combination of software and hardware into a tree-structured neuron module can achieve the effect of deploying various neural networks of different topology structures rapidly, so that the present invention can quickly switch between neural networks with different functions (for example: switching between supervised and unsupervised neural networks, switching between memorized and non-memorized neural networks, or switching between self-defined and open-sourced neural networks). This is an effect that cannot be achieved by conventional technology.

In an embodiment, the above-mentioned layered weight parameter module of neuro-computing sub-system comprises: an activation-function integration unit, a Laplace-transformation processing unit, and an activation-function updating unit. The activation-function integration unit is configured to work with various activation functions to perform a setting process according to a configured data of activation function managed by the layered weight parameter module and come out a setting result, so as to set an applicable activation function to a layered-weight parameter updating process for the neural network. The Laplace-transformation processing unit is configured to perform a Laplace transformation process according to the activation function configured by the layered weight parameter module and the weight-parameter data of the neurons to generate a Laplace operation result. The activation-function updating unit is configured to perform an activation-function updating process to derive a configured data of activation function corresponding to the layered-weight parameter data according to the Laplace operation result, wherein the layered weight parameter module can analyze and evaluate whether to coordinate the activation-function integration unit to reconfigure the corresponding activation function. Combining these elements in an implementation of software, hardware, or a combination of software and hardware into a layered weight parameter module with a storage media which is applicable for storing data of neuro-weight parameter and configured data of activation function, not only provides various activation functions for a neural network so that the neuro-computing sub-system can switch between neural networks with different functions, but also can quickly confirm whether the configured activation function is feasible for a time-variant data set. This is an effect that cannot be achieved by conventional technology.

In an embodiment, in order to enhance the generalization ability of the neural network, the above-mentioned layered weight parameter module of the neuro-computing sub-system further comprises: a normalization processing unit, a harmonic-function processing unit, a time-variant function processing unit; a multi-dimensional moment processing unit, a Fourier-transformation processing unit, and a wave-function processing unit. The normalization processing unit is driven for optimizing the performance of hidden layers according to the setting result from the activation-function integration unit, to perform a normalization processing program for an unbounded activation function. In addition, the harmonic-function processing unit is driven for the raw data that has phasing properties or can be expressed on a complex plane according to the setting result from the activation-function integration unit, to perform a harmonic-function mapping process, so that the configured activation function can support data which is in the form of complex number. Moreover, the time-variant function processing unit is driven to import time variables to the configured activation function if the layered weight parameter module determines that the hidden layer is unable to avoid gradient vanishing problem or gradient exploding problem according to the configured data of activation function, so as to facilitate the result of weight adjustment tending to converge. The multi-dimensional moment processing unit is driven to introduce an affine transformation process for a moment generating function to the configured activation function according to the configured data of activation function if the layered weight parameter module determines that the raw data fits the property of multi-variant continuous random variables, so as to facilitate the result of weight adjustment tending to converge. The Fourier-transformation processing unit configured to be driven to perform a Fourier-transformation process on the data propagated by the hidden layers via making use of the Dirac delta function to obtain a transformed data if the layered weight parameter module determines that the raw data has the distribution property of the Dirac delta function according to the configured data of activation function, so that the Fourier-transformation processing unit uses a ramp function as an activation function to import the transformed data into the activation function, for supporting the raw data with particle properties or the raw data in zero dimension. The wave-function processing unit is driven to perform a wave-function processing program to use an applicable wave function as the configured activation function according to the configured data of activation function if the layered weight parameter module determines that the raw data has the distribution property of a quantum many-body system, so as to facilitate the result of weight adjustment for quantum many-body system simulation tending to converge. Combining these elements in an implementation of software, hardware, or a combination of software and hardware into a layered weight parameter module not only enhances processing performance of the hidden layers, but also can facilitate whether the configured activation function is feasible for a time-variant data set. This is an effect that cannot be achieved by conventional technology.

In an embodiment, the above-mentioned tree-searching module of the neuro-computing sub-system comprises: a duplicate-neurons preventing unit and an upper confidence bounds applied to trees (UCT) searching unit. The duplicate-neurons preventing unit is configured to determine whether there are duplicate neuron nodes according to the tree-structured data derived by the tree-structured neuron module of neuro-computing sub-system, wherein the duplicate-neurons preventing unit derives duplicated-neuron information if there are duplicate neurons, thereby the tree-searching module can drive the state register unit of the residual-backpropagation sub-system to derive a corresponding training-breaker information, so that the neuro-computing sub-system can coordinate the tree-structured neuron module of the neuro-computing sub-system according to the training-breaker information, to perform a training-break mechanism. The UCT searching unit which performs an upper confidence bound (UCB) computing process based on the system tuning information from the residual-backpropagation sub-system and the raw data, tree-structured data, weight-parameter data, and non-linear analyzed data of the neuro-computing sub-system, to generate corresponding upper-confidence-bound information, thereby the tree-searching module determines whether the current neural network does not fit the UCB information and coordinate the state register unit to derive a training-breaker information if it does not, so that the neuro-computing sub-system can coordinate the tree-structured neuron module of the sub-system according to the training-breaker information, to perform a training-break mechanism. Combining these elements in an implementation of software, hardware, or a combination of software and hardware into a tree-searching module not only prevents the invalid training program from consuming system resources, but also further manages the distribution interval of decision-making data, and avoids wasting too much system resources in unnecessary decision-making data analysis processes.

In an embodiment, in order to enhance the tree-searching performance, the above-mentioned tree-searching module of the neuro-computing sub-system further comprises: a support vector machine (SVM) processing unit, a genetic algorithm (GA) searching unit, a Monte Carlo tree searching unit, a searching-schedule accelerating unit, and a hash-table searching unit. The SVM processing unit is driven to perform a hyperplane optimization process if the tree-searching module determines the current upper-confidence-bound is out of an applicable range according to the upper-confidence-bound information from the UCT searching unit, so as to adjust the decision-making boundary and optimize the upper-confidence-bound for avoiding too many invalid searching processes. In addition, the GA searching unit is driven to perform a genetic-algorithm computing process for a neural network composed of a variety of topological structures, so as to group neuron nodes to determine a target group, thereafter to perform a tree-structured data searching process on the target group, so that the tree-searching module can effectively simplify the searching scope. Moreover, the Monte Carlo tree searching unit is driven to perform a Monte Carlo tree search (MCTS) process for a neural network based on a tree-structured topology with a large depth, so that the tree-searching module can enhance the tree-searching performance through heuristic-searching processes, for better paths. The searching-schedule accelerating unit is driven to perform a B+tree searching process in a file system (e.g., NTFS is more suitable) embedded with B+tree file structure, for a neural network based on a tree-structured topology with a large width, so that the tree-searching module can perform the searching schedule with B+tree searching algorithm implementing range queries and ordered iteration based on the bottom-most index blocks, which can effectively save the search time. The hash-table searching unit is driven to store indexes in a hash table and perform an index-searching process with hash-searching algorithm, for a neural network composed of a tree-structured topology with a large number of indexes, so that the tree-searching module can effectively save search time. Combining these elements in an implementation of software, hardware, or a combination of software and hardware into a tree-searching module not only effectively solves the problem of system searching performance which is the key issue for neuron nodes adopting tree-like data structure, but also avoids large amount of system memory occupation. In some fields, especially for those data related to a local curvature which can be expressed as a Hessian matrix mapping to a function of many variables, such combination as a tree-searching module can do it well in efficiency via MCTS, UCT, and GA related technologies within the present invention. These effects make the neurons with tree-structured data be feasible to the technology field of neural network in industrial utilization.

In another embodiment, the above-mentioned system tuning module of the residual-backpropagation sub-system comprises: a residual analysis unit, a self-tuning processing unit, a state register unit, and a training breaker unit. T residual analysis unit, with more than one residual computing program, is configured to perform an applicable residual computing program according to the non-linear analyzed data imported by the progressive backpropagation input module to generate a residual analysis data. The self-tuning processing unit is configured to perform a self-tuning processing program based on the non-linear analyzed data and the residual analysis data, with an adaptive residual analysis for a backpropagation of residual compensation, to derive a system tuning information, wherein the system tuning information is for fine-tuning the neural network or for triggering a training-break mechanism. For the state register unit, the system tuning module can store more than one break-configuration switching data in the state register unit according to the system-state data. The training breaker unit is configured to determine whether a training-break condition is met according to the system tuning information from the self-tuning processing unit, wherein the training breaker unit works with the state register unit if the training-break condition is met, to generate a training-breaker information according to a selected break-configuration switching data, so that the residual-backpropagation sub-system can further coordinate the neuro-computing sub-system to perform a training-break mechanism according to the training-breaker information. Combining these elements in an implementation of software, hardware, or a combination of software and hardware as a system tuning module not only facilitates the applicability of decision-making data via making use of proper system-tuning mechanism, but also effectively ensures the individuality of decision-making data through introducing the training-break mechanism, so as to avoid the issue that the legacy unsupervised neural network is easy to over-eigenize non-important features of data during a training process so that will tend to derive ordinary decision-making data.

In another embodiment, in order to enhance the management for training states and system tuning information, the above-mentioned system tuning module of the residual-backpropagation sub-system further comprises: a state recovery unit, a state switching unit, a data encoding unit, a state deletion unit, a visualized monitoring unit, a data compressing unit, and a history tracing unit. The state recovery unit is for a system that has already performed a training-break mechanism, wherein if the factor that caused the training-break has been eliminated, the state recovery unit will be driven to facilitate the system to restore a normal state which is before the training-break mechanism is triggered, according to the break-configuration switching data stored in the state register unit. The state switching unit is driven to perform a state switching process according to the break-configuration switching data stored in the state register unit if the current decision-making result is more degraded than the previous decision-making result or there are multiple types of raw data that must be switched, so as to facilitate the system to switch to a previous state which is more applicable. In addition, the data encoding unit is for enhancing the confidentiality of system tuning information, residual-feedback data, or training-breaker information during transmission, wherein the data encoding unit is driven to perform an encoding process on the system tuning information, residual-feedback data or training-breaker information, so as to reduce the risk of leaking sensitive information. Moreover, the state deletion unit is driven to perform a deletion process for required specific system state to avoid the leakage of the parameters related to important training processes in an event of system intrusion, so as to reduce the risk of leaking sensitive information. Besides, the visualized monitoring unit is driven to perform a visualized interface process on a specific monitor device for providing a system administrator a remote monitoring mechanism. Meanwhile, the data compressing unit is driven to perform a data compressing process on an output data to facilitate the transmission for system tuning information, residual-feedback data or training-breaker information between different modules through different devices, so as to enhance the efficiency of bandwidth utilization between different transmission devices. The history tracing unit is driven to perform a history tracing mechanism for data stream in transmission to enhance data security and avoid a large number of repeated decision-making processes, so that the system tuning module can find out abnormal transmission data via reviewing history logs. Combining these elements in an implementation of software, hardware, or a combination of software and hardware into a system tuning module for transmitting priority or sensitive data stream through network environment not only can spread the risks via deploying these units in different places for the neuro-computing sub-system and the residual-backpropagation sub-system, but also can provide effective maintenance and management mechanisms for decision-making data with commercial value, so as to make the present invention can be implemented as a neural network artificial intelligence decision-making core system with data security design.

DETAILED DESCRIPTION OF THE INVENTION

To facilitate understanding of the objects, characteristics and effects of this present disclosure, embodiments together with the attached drawings for the detailed description of the present disclosure are provided.

A plurality of embodiments in regard to an artificial-intelligence decision-making core system with neural network which can be applied to a variety of trained data from external non-specific models (such as financial models, human behavior models, war chess models, etc.), to facilitate deriving decision-making data with applicability and individuality, are provided as follows. In an embodiment of this aspect, the system can be further implemented a decision-making core system with security protection mechanism. In some embodiments, this technology can be implemented as a combination of a disk-array management device, an embedded system and a server-virtualization platform, based on a Software Defined Network (SDN) infrastructure, and data transmission between sub-systems can be performed via network functions virtualization (NFV) components including virtual gateway/router for data transmission channels between different virtual network segments.

Figure 1:
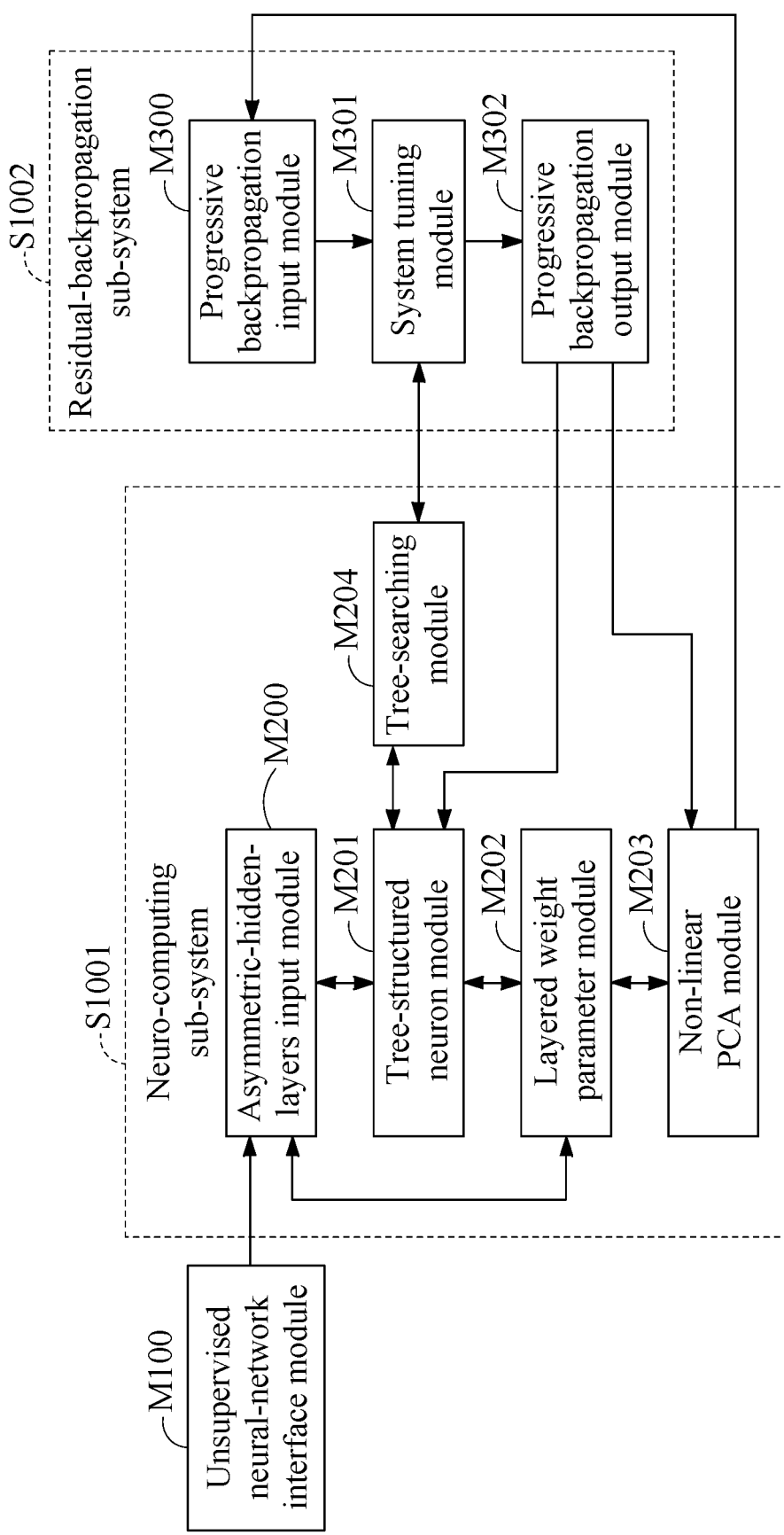
FIG. 1 is a structural block diagram of a system according to an embodiment of the present invention.

Refer to FIG. 1, which is a structural block diagram of a decision-making core system according to an embodiment of the present invention. The artificial-intelligence decision-making core system with neural network S1000 comprises an unsupervised neural-network interface module M100, a neuro-computing sub-system S1001, and a residual-back-propagation sub-system S1002. In an embodiment, the unsupervised neural-network interface module M100 comprises at least a computing-and-storage device (or a computing device), wherein this device can be implemented as an input device for an unsupervised neural network to receive a raw data, and an interface of this device for receiving the raw data can be applied to a variety of trained data from external non-specific models (such as financial models, human behavior models, war chess models, etc.). A conventional neural-network input device for decision-making analysis is usually only applicable for raw data from specific model. For example, a neural-network device for health analysis usually cannot accept the history data of stock market through the same design. However, the interface of the present invention for receiving the raw data can be applied to various trained data from non-specific models via general classification settings (such as parameter configuration, attribute configuration, or labeling configuration, but not limited to the above configurations). In an embodiment, M100 can be implemented as a server with a disk-array management unit, and a variety of trained data from external non-specific models can be uploaded to M100 as the raw data of the system S1000. The disk-array management unit of M100 makes use of a random-storage algorithm (such as adopting array or dynamic arrays co-working with a combination of merge-sorting operations, or other random-storage algorithm which is well known to a person having ordinary skill in the art related to the present invention) to distribute the raw data into disk array, and the physical storage media of the disk array is not limited to be installed in a single server. Through such interface management mechanism of the unsupervised neural-network interface module M100, this device not only can extract a specific trained data set quickly, but also provides a data risk management framework for data storage. In addition, this embodiment is only a feasible example, and the implementation of the module M100 is not limited thereto.

In an embodiment, the above-mentioned neuro-computing sub-system S1001 is implemented with at least one computing device integrated with or coupled to a storage device, connected to the unsupervised neural-network interface module M100, for performing a pre-processing computing process (for example, comprising operations of data cleaning, data editing, data reduction, data wrangling, and so on, such like some conventional data pre-processing routines for neural-network deep learning) on the raw data to obtain pre-processed data. Thereafter, S1001 performs a neuron operation process that can dynamically update the neuron node, and then derives corresponding non-linear analyzed data and decision-making data, via a non-linear PCA computing process. A conventional neuron operation process is usually based on the following input/output relation: output=$f_{activation}(\Sigma(weight*input)+bias)$. However, in the present invention, the above-mentioned the "neuron operation process that can dynamically update the neuron node" means not only weight and input but also bias, and even the activation function can be updated dynamically through this neuron operation process. In an embodiment, the sub-system S1001 can be implemented as an embedded system integrated with a Neural Compute Stick (NCS), where the neural network according to the present invention can be implemented on this neural compute stick practically, and one or more processors of the embedded system can co-work with a specific combination of instructions stored in the embedded system to perform the above mentioned operation processes related to S1001.

Referring to FIG. 1, in an embodiment, the above-mentioned residual-backpropagation sub-system S1002 is coupled to the neuro-computing sub-system S1001, for performing a residual compensation computing process based on the non-linear analyzed data derived from S1001, to generate system tuning information and residual-feedback data, or training-breaker information, to facilitate the neuro-computing sub-system S1001 to derive individual and applicable decision-making data. The system tuning information is used by the neuro-computing sub-system S1001 to correct or tune its neural network. The training-breaker information is used by the neuro-computing sub-system S1001 to perform a training-break mechanism on a training process in the neural network. The residual-feedback data is to facilitate the neuro-computing sub-system S1001 to derive or correct the decision-making data. In an embodiment, the sub-system S1002 can be implemented as a server-virtualization platform with a plurality of virtual machines (VMs), wherein one of the VMs can be performed as a monitor-and-management unit to coordinate the other VMs to complete the above-mentioned operation processes related to S1002. However, this embodiment is only a feasible example, and the implementation of the sub-system S1002 is not limited thereto.

Figure 2:
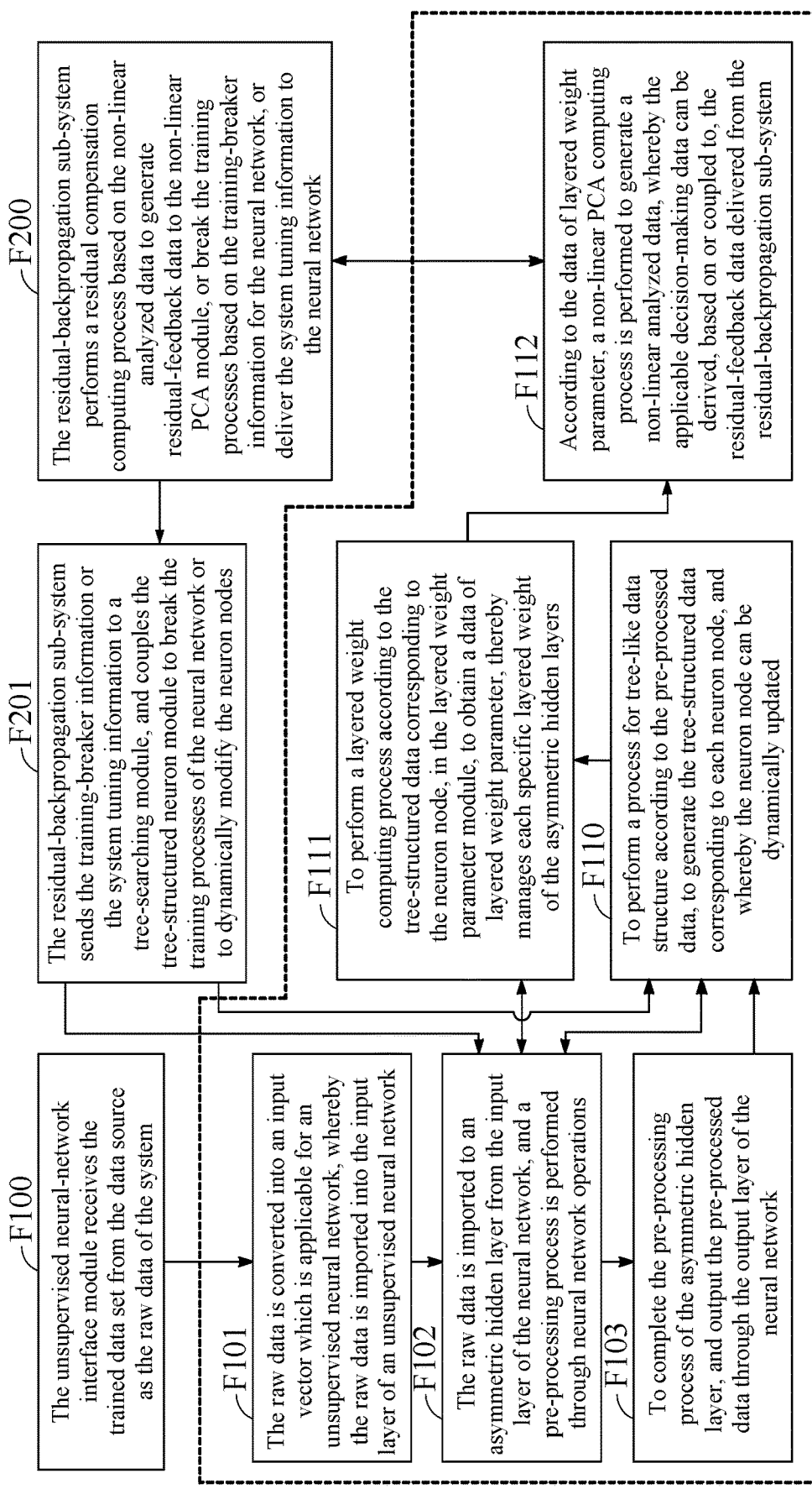
FIG. 2 is a dataflow diagram showing main data flow related to an embodiment of the present invention.

Refer to FIG. 2, which is a dataflow diagram showing main data flow related to an embodiment of the artificial-intelligence decision-making core system with neural network S1000 shown in FIG. 1. As shown in FIG. 2 and also referring to FIG. 1, a dataflow is illustrated based on one of user scenarios for implementing S1000 of an embodiment of the present invention. First, as shown in block F100, the unsupervised neural-network interface module M100 receives the trained data set from the data source as the raw data of the system. Then, as shown in block F101, the raw data is converted into an input vector which is applicable for an unsupervised neural network, whereby the raw data is imported into the input layer of an unsupervised neural network. After that, as shown in block F102, the raw data is imported to an asymmetric hidden layer from the input layer of the neural network, and a pre-processing process is performed through neural network operations. Then, as shown in block F103, the system S1000 completes the pre-processing process of the asymmetric hidden layer, and output the pre-processed data through the output layer of the neural network. Thereafter, as shown in block F110, the system S1000 performs a process for tree-like data structure according to the pre-processed data, to generate the tree-structured data corresponding to each neuron node, and whereby the neuron node can be dynamically updated; here the mentioned neuron node which can be dynamically updated is mainly located in the asymmetric hidden layer shown in block F102. Once the F102-mentioned asymmetric hidden layer changes the states of a neuron node during a training process, the F110-mentioned tree-structured data will be updated as well. Thereafter, as shown in block F111, the system S1000 performs a layered weight computing process according to the tree-structured data corresponding to the neuron node, in the layered weight parameter module, to obtain a data of layered weight parameter, thereby manages each specific layered weight of the asymmetric hidden layers; here the F111-mentioned the data of layered weight parameter is for use in a training process related to the asymmetric hidden layers through a management mechanism. Thereafter, as shown in block F112, the data of layered weight parameter will be processed within the dataflow of block F112; according to the data of layered weight parameter, a non-linear principal component analysis (PCA) computing process is performed to generate a non-linear analyzed data, whereby the applicable decision-making data can be derived, based on or coupled to, the residual-feedback data delivered from the residual-backpropagation sub-system. So far, the dataflow shown in the above blocks F101-F112 can be implemented in the neuro-computing sub-system S1001 as shown in FIG. 1. However, in order to maintain the applicability and individuality of the derived decision-making data mentioned in block F112, the non-linear analyzed data mentioned in block F112 will be introduced to the dataflow shown by block F200.

As shown in block F200, the residual-backpropagation sub-system performs a residual compensation computing process based on the non-linear analyzed data to generate residual-feedback data to the non-linear PCA module, or break the training processes based on the training-breaker information for the neural network, or deliver the system tuning information to facilitate correcting or tuning the neural network; here the block F200-mentioned residual-feedback data will be introduced back to the dataflow shown in block F112 for correcting the decision-making data, and the block F200-mentioned training-breaker information or system tuning information will be introduced to the dataflow shown in block F201. As described in block F201, the residual-backpropagation sub-system sends the training-breaker information or the system tuning information to a tree-searching module, and couples the tree-structured neuron module to break the training processes of the neural network or to dynamically modify the neuron nodes. So far, the dataflow shown in the above block F200 can be implemented in the residual-backpropagation sub-system S1002 as shown in FIG. 1, and the dataflow described in block F201 goes from sub-system S1002 to sub-system S1001; wherein, the block F201-mentioned tree-searching module is located in the sub-system S1001, and this module is also the entry-point of the sub-system S1001 for receiving the training-breaker information or the system tuning information derived from the sub-system S1002; through a tree-searching process, here the tree-searching module can find an index of the neuron node which is required to be processed, and then the index will be delivered with the training-breaker information or the system tuning information to the block F201-mentioned tree-structured neuron module. Thereafter, the tree-structured neuron module will perform a training-break mechanism according to the index with the training-breaker information through the dataflow related to the block F102 to break a training process; or perform to update neuron nodes dynamically according to the index with the system tuning information through the dataflow related to the block F110, so as to tune the neural network. Based on the above dataflow, the implementation of each component corresponding to the present invention will be described as follows.

Referring to FIG. 1, in the above embodiment, the neuro-computing sub-system S1001 comprises: an asymmetric-hidden-layers input module M200, a tree-structured neuron module M201, a layered weight parameter module M202, a non-linear PCA module M203, and a tree-searching module M204. The asymmetric-hidden-layers input module M200 can perform a data pre-processing program on raw data sent from the unsupervised neural-network interface module M100 of the artificial-intelligence decision-making core system S1000, to derive a pre-processed data; here the asymmetric-hidden-layers input module M200 is formed by unsupervised neural network, and the asymmetric-hidden-layers means that the bidirectional weights between neuron nodes in the hidden layers are not equal. The tree-structured neuron module M201 for managing neuron nodes of a neural network is connected to the asymmetric-hidden-layers input module M200, including a plurality of neuron-node data (or data representing neuron nodes), wherein the module can perform a tree-structured data processing program based on the received pre-processed data, to generate tree-structured data corresponding to each neuron node. Meanwhile, M201 can correct the tree-structured data of neuron nodes according to the system tuning information derived from the residual-backpropagation sub-system S1002. The layered weight parameter module M202 is connected to the tree-structured neuron module M201 and performs a layered weight parameter computing process according to the tree-structured data derived from M201, to obtain a layered weight parameter data for managing the specific weight of each hidden layer in the neural network, so that in addition to parameters related to individual neurons, the layered weight factors should also be considered for tuning a neural network. For example, the above-mentioned layered weight parameter computing process comprises the steps of matrixing individual neuron weights included in each layer of the hidden layers, normalizing by geometric average method to extract the eigenvector, and vectorizing the layered weights according to the consistency index. However, the combination of the above steps is only a feasible example of the present invention, and its main purpose is to integrate the weight parameter data of the layered individual neurons to derive the vectorized layered weight relationship applicable to the raw data. In addition, the non-linear PCA (principal component analysis) module M203 for deriving a non-linear analyzed data is connected to the layered weight parameter module M202 to perform a non-linear PCA computing process according to the layered weight parameter data derived by M202, wherein the non-linear PCA module M203 can derive applicable decision-making data based on the non-linear analyzed data or can work with the residual-feedback data from the residual-backpropagation sub-system S1002 to improve the decision-making data. The tree-searching module M204 is coupled to the tree-structured neuron module M201 and the residual-backpropagation sub-system S1002 for breaking the neural-network training process in time to maintain the differentiation and the applicability of the decision-making data.

Figure 5A:
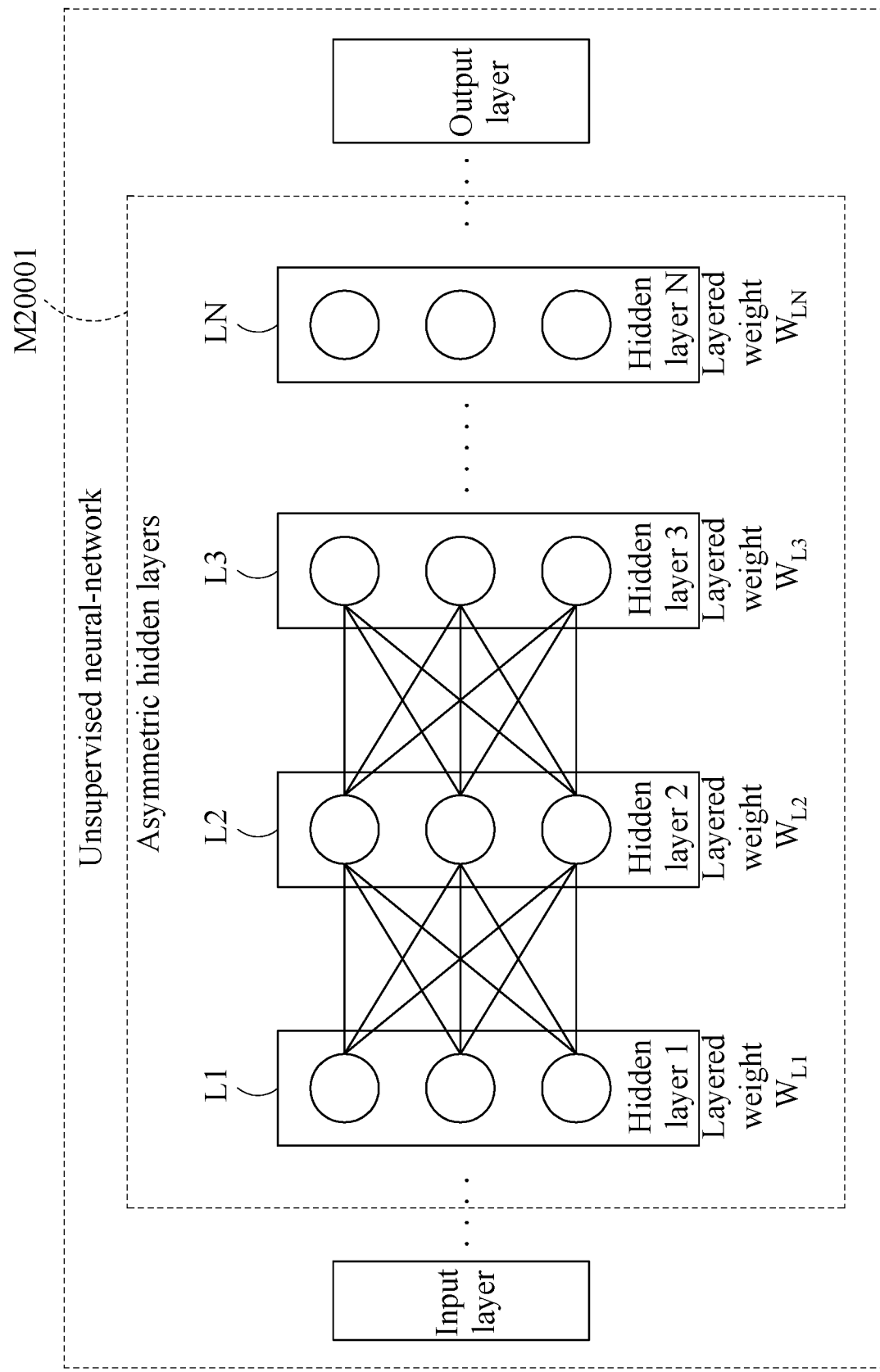
FIG. 5A is a block diagram of an asymmetric-hidden-layers input module according to an embodiment of the present invention.

For example, the modules (M200-M204) mentioned in the above embodiments can be implemented with part or all of at least one storage device, and store combinations of specific instructions or programming code, which can be coupled to one or more processors, to perform processes related to the above modules (M200-M204) (such as tree-structured data processing program, layered weight parameter computing process, non-linear PCA computing process, etc.). For example, the above-mentioned asymmetric-hidden-layers input module M200 comprises programming data of a neural network based on an embodiment of the present invention, for implementing the neural network of the present invention. Refer to FIG. 5A, which is a block diagram of an asymmetric-hidden-layers input module according to an embodiment of the present invention. As shown in FIG. 5A, the asymmetric-hidden-layers input module M200 implements an unsupervised neural network internally, and the core of the unsupervised neural network is the asymmetric hidden layers M20001. Although the asymmetric-hidden-layers input module M200 here uses an unsupervised neural network without reference target, the hidden layer of the unsupervised neural network adopts asymmetric hidden layers M20001 where each neuron has weight of forward propagation and weight of back propagation, and the weight of forward propagation is not equal to the weight of back propagation in the hidden layers. Meanwhile, each layer of the asymmetric hidden layers M20001 (such as represented by L1, L2, L3-LN) has the layered weight of each layer (such as represented by $W_{L1}$, $W_{L2}$, $W_{L3}$, $W_{LN}$), and N≥2. For example, any of the layers L1, L2, L3-LN can have a plurality of neurons. FIG. 5A is only an example for illustration, and each layer can be implemented with an individual corresponding number (such as the same or different numbers) of neurons, and the implementation is not limited to FIG. 5A. For another example, the layered weights of each layer (such as $W_{L1}$, $W_{L2}$, $W_{L3}$, . . . , $W_{LN}$) can be implemented as a set of weight parameters corresponding to the layer, such as the layered weights of each layer can be implemented as a weight parameter corresponding to the layer, or a plurality of weight parameters corresponding to the layer.

Figure 5B:
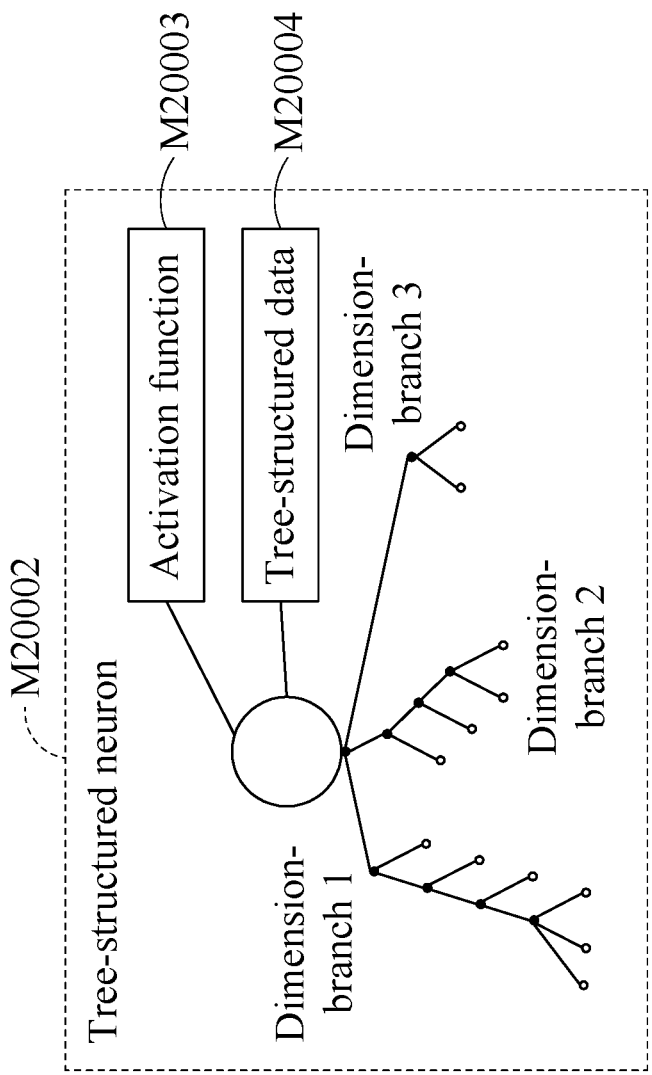
FIG. 5B is a block diagram of an asymmetric-hidden-layers input module according to an embodiment of the present invention.

In addition, in an embodiment, as shown in FIG. 5B, the neuron adopted in the asymmetric-hidden-layers input module M200 is a tree-structured neuron M20002 with tree-structured data. The tree-structured neuron M20002 here not only comprises an activation function M20003 as a conventional neuron owns, but also owns corresponding tree-structured data M20004. For example, an implementation of the tree-structured data M20004 adopts an unbalanced tree as its basic architecture, and builds-in a set of specific instructions or programming code that can perform a branch-and-bound method to save searching paths a lot. Meanwhile, according to the features of the variable dimension of the raw data, the related parameters, attributes, and weights of the raw data variables can be divided into different dimensional branches for storing, for example, dimension-branch 1 is for storing the parameters, attributes and weights of variable 1, and dimension-branch 2 is for storing the parameters, attributes and weights of variable 2, and so on. Such practice of the tree-structured data M20004 not only can tune the weight of neurons in real time, but also can support neurons to perform dimensional switching or integration between or with different dimensional data variables. In some special embodiments (as will be described later), coupled to specific modules, it can also quickly transform the topology of neural networks (such as switching between supervised and unsupervised neural networks, between memory and non-memory neural network, or between customized and open-source neural network), thereby it can be seen that the implementation of the above tree-structured neuron provides several effects that cannot be achieved by a conventional technology.

Figure 5C:
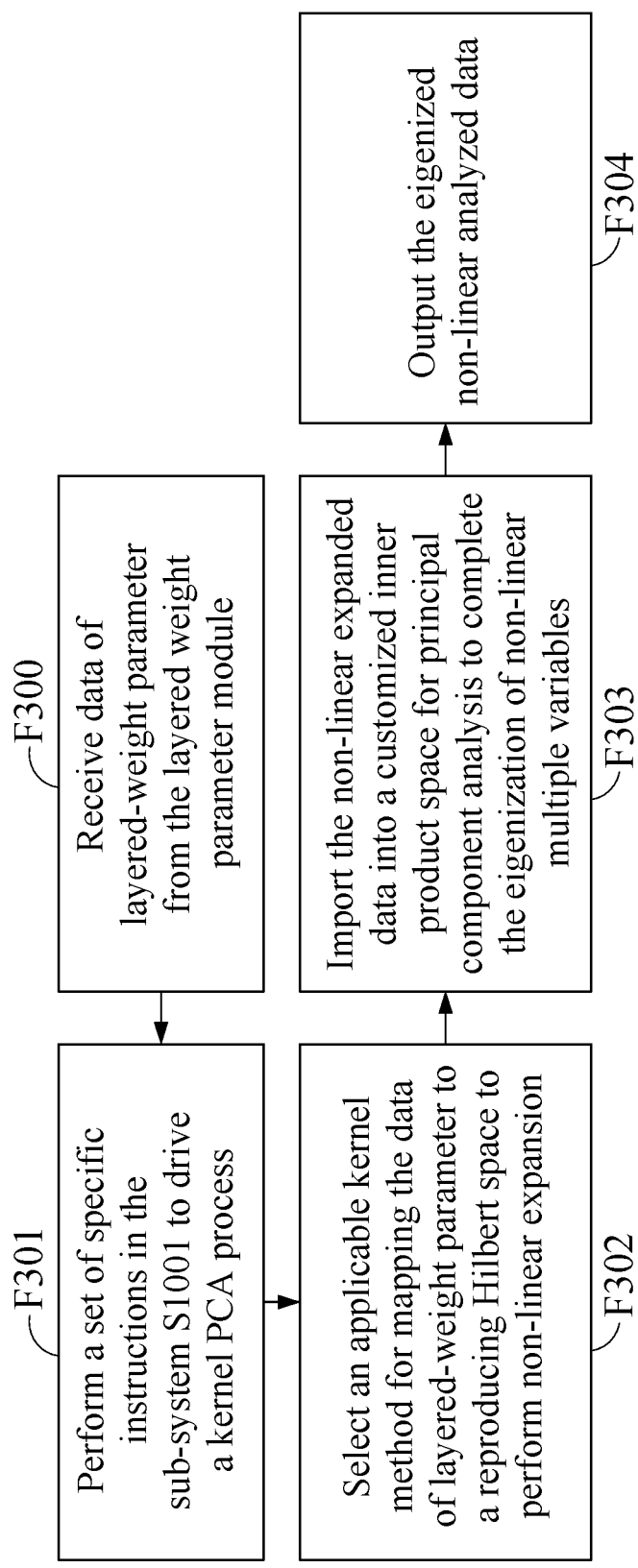
FIG. 5C is a dataflow diagram showing main data flow related to a non-linear PCA computing process according to an embodiment of the present invention.

Thereafter refer to FIG. 5C, which is a dataflow diagram showing main data flow related to a non-linear PCA computing process according to an embodiment of the non-linear PCA module M203 of the neuro-computing sub-system S1001. As the description shown in block F300, the non-linear PCA module M203 receives data of layered-weight parameter from the layered weight parameter module M202 at first. Thereafter, as shown in block F301, the non-linear PCA module M203 performs a set of specific instructions in the sub-system S1001 to drive a kernel PCA process. Then, as shown in block F302, M203 selects an applicable kernel method, and then maps the data of layered-weight parameter to a reproducing Hilbert space through the kernel method, so as to perform non-linear expansion to obtain a non-linear expanded data. Then, as shown in block F303, the module M203 imports the non-linear expanded data into a customized inner product space for principal component analysis to complete the eigenization of non-linear multiple variables. Then, as shown in block F304, the non-linear PCA module M203 finally outputs the eigenized non-linear analyzed data. However, the above description is only a feasible example of the non-linear PCA computing process. The practice of the related data flows is not limited thereto. The data flow after the non-linear expansion may be different due to the different selection of the applicable kernel method (for example, Gaussian kernel, RBF kernel, hyperbolic tangent kernel, etc.), but the main purpose of this computing process is to output the non-linear analyzed data that has been eigenized.

In an embodiment, the asymmetric-hidden-layers input module M200 shown in FIG. 1 can be implemented in a neural computing stick, which is integrated in an embedded system platform, and the modules M201-M204 related computing processes are stored in the embedded system platform in the form of a set of specific instructions, programming code, or development library. Meanwhile, these modules can be coupled to one or more processors of the embedded system platform to perform the above related processes. However, this embodiment is only a feasible example, and the implementation of the modules M200-M204 is not limited thereto. Combining these elements in an implementation of software, hardware, or a combination of software and hardware as a neuro-computing sub-system can dynamically tune the neuron nodes to suit various types of trained data, and can make an unsupervised neural network with asymmetric hidden layers derive the data of layered weight parameters which covers multi-dimensional variables. Meanwhile, the sub-system can flexibly import an applicable residual compensation mechanism, make use of the method of performing non-linear PCA combined with the data of layered weight parameters, and further eigenize the data set with non-linear multi-dimensional variables, thereby a decision-making neural network applicable for various data types can be practiced, and it is an effect that cannot be achieved by a conventional technology.

Figure 4:
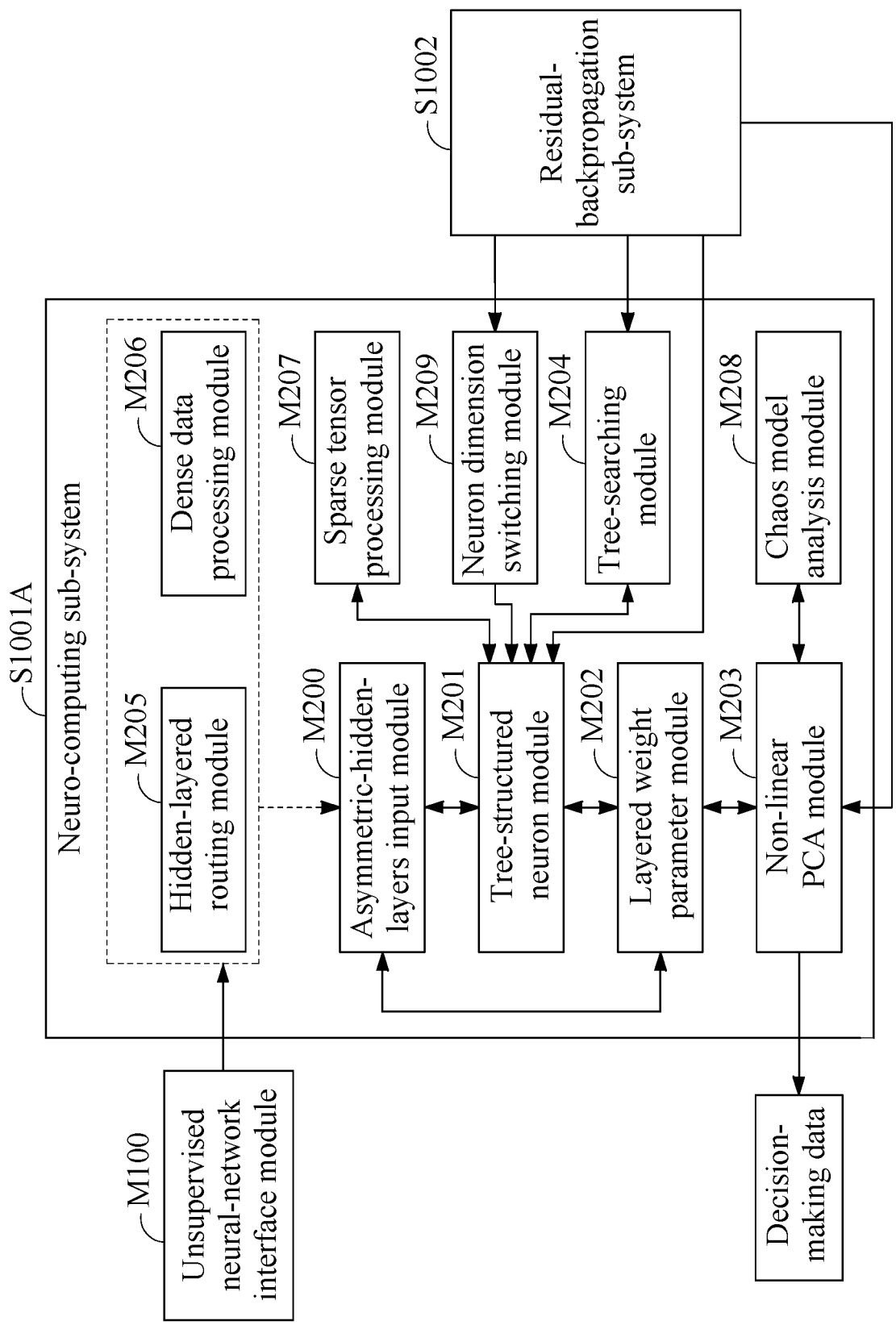
FIG. 4 is a structural block diagram of a system according to an embodiment of the present invention.

Referring to FIG. 4, in an embodiment, in order to enhance the decision-making quality of the core system, the above-mentioned neuro-computing sub-system S1001A further comprises the following modules: a hidden-layered routing module M205, a dense data processing module M206, a sparse tensor processing module M207, a Chaos model analysis module M208, and a neuron dimension switching module M209. Wherein, through a hidden-layered routing process, the hidden-layered routing module M205 can receive the raw data from the unsupervised neural-network interface module M100 of the decision-making core system, and plan a route (e.g., a feasible route) for the hidden layers according to the attributes of the raw data, thereby the sub-system S1001A supports variable propagation paths for the hidden layers of the neural network dynamically. The dense data processing module M206 can analyze the raw data from the unsupervised neural-network interface module M100 of the decision-making core system and perform a dense data processing program if there is a high-density attribute with the raw data. Here, for example, the dense processing program comprises the following steps: dropping invalid data, finding integrable duplicate data, and normalizing the duplicate data; however, the combination of above steps is only a feasible example of the present invention; and then the data derived from M206 is imported into the asymmetric-hidden-layers input module M200. The sparse tensor processing module M207 is coupled to the tree-structured neuron module M201 of the sub-system S1001A that can analyze the derived neuron nodes to verify whether the nodes fit the conditions of sparse tensor, whereby when the neurons are in the condition of sparse tensor, the module M207 can perform a sparse matrix operation process to facilitate computing performance and save system memory usage.

In an embodiment, the Chaos model analysis module M208 is coupled to the non-linear PCA module M203 of the sub-system S1001A that can further perform a Chaos model analysis process to facilitate the derivation of the decision-making data when the non-linear PCA module M203 cannot make effective corrections according to the residual-feedback data sent from the residual-backpropagation sub-system S1002. The neuron dimension switching module M209 is coupled to the tree-structured neuron module M201 that can perform a neuron dimension switching process based on system tuning information from the residual-backpropagation sub-system S1002, to facilitate the switching of the decision-making style, whereby the module can enhance the differentiation and applicability of the decision-making data.

Figure 5D:
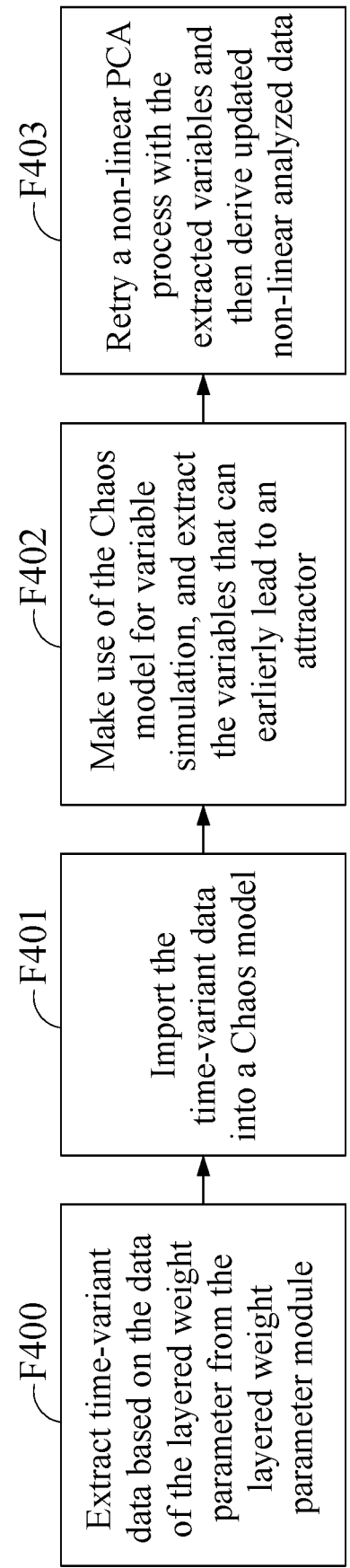
FIG. 5D is a dataflow diagram showing main data flow related to a non-linear PCA computing process according to an embodiment of the present invention.

For example, the modules (M205-M209) mentioned in the above embodiments can be implemented with part or all of at least one storage device, and store combinations of specific instructions or programming code, which can be coupled to one or more processors, to perform processes/programs related to the above modules (M205-M209) (such as hidden-layered routing process, dense data processing program, sparse matrix operation process, etc.). In addition, in some embodiments based on embedded systems, M205 and M206 can also be integrated in a dedicated library package for source data pre-processing, so that the raw data from M100 can be performed a source data analysis and a data pre-processing to obtain an optimized raw data to be imported into the asymmetric hidden layer input module M200. Thereafter refer to FIG. 5D, which is a dataflow diagram showing main data flow related to a non-linear PCA computing process in an embodiment. For some raw data with time-variant features, when the non-linear PCA module M203 cannot make effective corrections according to the residual-feedback data sent from the residual-backpropagation sub-system S1002, a Chaos model analysis process of the Chaos model analysis module M208 will be performed as shown in FIG. 5D. First, in the above condition, as shown in block F400, the Chaos model analysis module M208 extracts time-variant data based on the data of the layered weight parameter from the layered weight parameter module M202. Thereafter as shown in block F401, M208 imports the time-variant data into a Chaos model. Then, as shown in block F402, M208 makes use of the Chaos model for variable simulation, and extracts the variables that can earlierly lead to an attractor. Finally, as shown in block F403, the non-linear PCA module M203 will retry a non-linear PCA process with the variables extracted by M208, and then derive an updated non-linear analyzed data. However, the above description is only a feasible example of the Chaos model analysis process. The practice of the related data flows is not limited thereto. The data flow after the variable simulation may be different due to the different selection of the Chaos model, but the main purpose of this analysis process is to import the extracted time-variant data set into the non-linear PCA module for retrying the non-linear PCA process.

In an embodiment, referring to FIG. 4, the above-mentioned modules M205-M209 related computing processes are usually stored the embedded system platform in the form of a set of specific instructions, programming code, or development library. Meanwhile, these modules can be coupled to one or more processors of the embedded system platform to perform the above related processes. However, this embodiment is only a feasible example, and the implementation of modules M205-M209 is not limited thereto. Combining these elements in an implementation of software, hardware, or a combination of software and hardware into a neuro-computing sub-system can enhance the derivation performance of decision-making data a lot, and facilitate to practice the effect of feasible decision-making in the real time, thereby such combination should be more progressive than the conventional technology.

Figure 8:
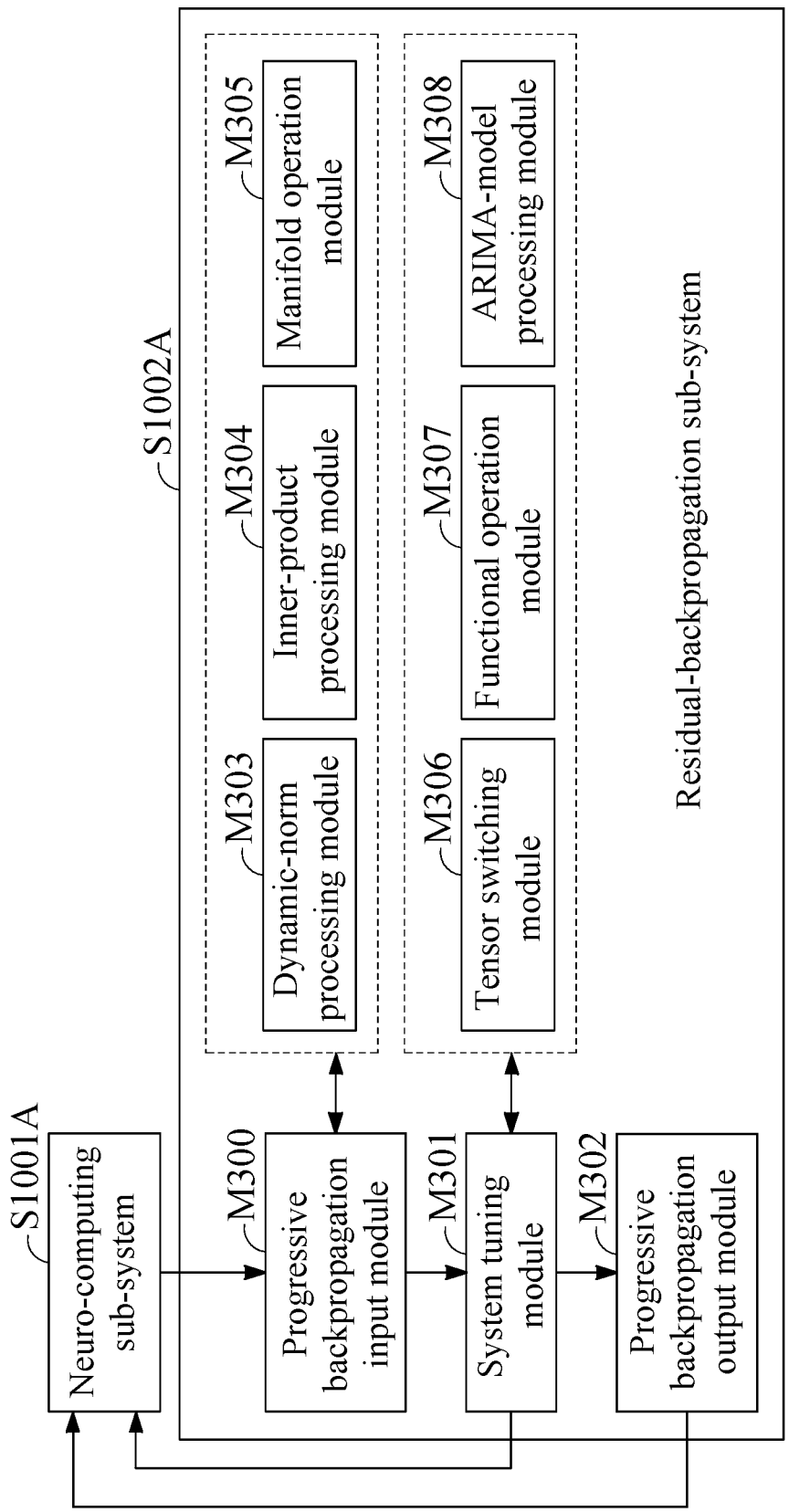
FIG. 8 is a structural block diagram of a residual-back-propagation sub-system according to an embodiment of the present invention.

Referring to FIG. 8, in an embodiment, the above-mentioned h residual-backpropagation sub-system S1002A comprises the following modules: a progressive backpropagation input module M300, a system tuning module M301, and a progressive backpropagation output module M302. The progressive backpropagation input module M300 is for receiving non-linear analyzed data from the non-linear PCA module M203 of above-mentioned neuro-computing sub-system S1001A. The system tuning module M301 is to perform a residual compensation computing process for the non-linear analyzed data, to derive a feedback-tuning information, and trigger a training-break mechanism of neural network according to the feedback-tuning information or deliver the feedback-tuning information. The progressive backpropagation output module M302 is based on the updated state of the system tuning module M301 and the derived feedback-tuning information, to derive a residual-feedback data and sends the residual-feedback data to the non-linear PCA module M203 of the neuro-computing sub-system S1001A for facilitating the neuro-computing sub-system S1001A to maintain the differentiation and applicability of the decision-making data. Combining these elements in an implementation of software, hardware, or a combination of software and hardware as a residual-backpropagation sub-system not only can improve the accuracy of the training model built by neural network, but also can manage the distribution range of the decision-making data effectively, and further prevent the neural-network training model from being interfered by external abnormal data. This is an effect that cannot be achieved by a conventional technology.

Referring to FIG. 8, in an embodiment, in order to enhance the processing ability for non-linear analyzed data, the residual-backpropagation sub-system S1002A further comprises: a dynamic-norm processing module M303, an inner-product processing module M304, a manifold operation module M305, a tensor switching module M306, a functional operation module M307, and an ARIMA-model processing module M308. For example, the dynamic-norm processing module M303 is for non-linear analyzed data that can be vectorized or matrixed, wherein the progressive backpropagation input module M300 of the residual-backpropagation sub-system S1002A can further coordinate the dynamic-norm processing module M303 to perform a pre-processing program. Here, for example, the pre-processing program mainly comprises the following steps: vectorizing or matrixing the raw data according to the dimension of the raw data variables, selecting an applicable norm (such as L-0, L-1, L-2 or L-∞, etc.) according to the features of the dimension of the raw data variables, and using the selected norm to optimize the target vector or target matrix, so as to import the vectorized data or matrixed data which has been optimized to the system tuning module M301 for operation of residual-compensation mechanism. In addition, if the non-linear analyzed data reveals that most of the layered weights are in a large scale, the progressive backpropagation input module M300 of the residual-backpropagation sub-system S1002A can further coordinate the dynamic-norm processing module M303 to perform a re-initialization process to implement a norm-penalty mechanism for the hidden layers to re-initialize the related weight parameters of the neural network for reducing possible overfitting.

In an embodiment, the inner-product processing module M304 is for vectorized data or matrixed data with image properties, wherein the progressive backpropagation input module M300 of the residual-backpropagation sub-system S1002A can further coordinate the inner-product processing module M304 to perform another pre-processing program. Here, for example, the another pre-processing program mainly comprises the following steps: customizing (to self-define) the relationship between a point and a vector via an operation of scalar projection, expressing the relationship among each point as the sum of the products of the vertical vectors projected on the standard basis via the inner product operation of the vertical vectors (for example, $A \cdot B = A \cdot \Sigma_i (b_i e_i) = \Sigma_i (b_i (A \cdot e_i)) = \Sigma_i (b_i a_i)$), and finally deriving the orthogonalization factors expressed as a vector or matrix, so as to introduce standard orthogonal basis to the system tuning module M301 to improve the operation of residual-compensation mechanism. Certainly, the combination of the above steps is only a feasible example of this process, and the invention is not limited thereto. The manifold operation module M305 is for non-Euclidean space data, wherein the module M300 of the sub-system S1002A can further coordinate the manifold operation module M305 to perform another pre-processing program. Here, for example, the another pre-processing program mainly comprises the following steps: resolving the data in non-Euclidean space into a smooth manifold with Riemannian metrics via an operation of Riemannian geometry, and using Nash embedding theorems to equidistantly embed the smooth manifold into an Euclidean space, so as to switch the non-Euclidean space data into the form of an Euclidean space, so that the module M300 can introduce sampling data from various geometry spaces to the system tuning module M301 to enhance the applicability of the residual-compensation mechanism. Certainly, the combination of the above steps is only a feasible example of this process, and the invention is not limited thereto. The tensor switching module M306 is for time-variant data, wherein the system tuning module M301 of the sub-system S1002A can further coordinate the tensor switching module M306 to perform a self-correction process to switch the residual data already processed by residual-compensation mechanism through various dimensional spaces. Here, for example, the self-correction process mainly comprises the following steps: switching the residual data which has completed the compensation operation of the residual analysis into different dimensions, performing regression analysis on the switched data of different dimensions, and determining the most suitable switching dimension according to the regression analysis results of each dimension, so as to find the optimal residual-operation space that is most feasible for the time-variant data to enhance the applicability of residual-compensation mechanism. Certainly, the combination of the above steps is only a feasible example of this process, and the invention is not limited thereto.

In an embodiment, the functional operation module M307 is for the computing process of obtaining the optimal solution of loss function via making use of boosting algorithm, wherein the module M301 of the sub-system S1002A can further coordinate the functional operation module M307 to perform a mathematical programming process with functional operations, where the mathematical programming process is to facilitate the derivation of the optimal solution according to the loss function, so as to maintain the accuracy of the residual-compensation mechanism. The ARIMA-model processing module M308 is for non-stationary residual data, wherein the system tuning module M301 of the residual-backpropagation sub-system S1002A can further coordinate the ARIMA-model processing module M308 to perform a stationary process, where the stationary process mainly comprises the following steps: operating the raw residual data through integration of differencing steps for obtaining evolving variables, performing an auto regression on the evolving variables for deriving a stationary sequence to obtain a stationary residual data, and determining whether the stationary residual data fits a white-noise sequence, so as to confirm whether the raw non-stationary residual data needs correcting. Certainly, the combination of the above steps is only a feasible example of this process, and the invention is not limited thereto. For example, the modules (M300-M308) mentioned in the above embodiments can be implemented with part or all of at least one storage device coupled to a computing device, and store combinations of specific instructions or programming code or copies of virtual machines, which can be coupled to one or more processors, to perform processes/programs related to the above modules (M300-M308) (such as dynamic-norm pre-processing program, inner-product pre-processing program, manifold-operation pre-processing process, etc.). In an embodiment, referring to FIG. 8, the above modules M300-M308 related computing processes are usually stored in a server-virtualization platform in the form of a specific virtual machine copy, and can be coupled to one or more processors of the server-virtualization platform to perform the above related processes/programs. M300-M302 can be implemented as individual virtual machine copies, while M303-M305 can usually be integrated into a virtual machine copy of a dedicated pre-processing server, and M306-M308 can usually be integrated into a virtual machine copy of a dedicated residual-management server. These virtual machines communicate with each other through dedicated virtual network segment for coordinating operations, so as to form a residual-feedback sub-system S1002A. However, the embodiment is only a feasible example of the present invention, and the implementation of the modules M300-M308 is not limited thereto. For example, implementing each module as a physical server or as a cloud service is also an implementation model based on the present invention. Combining these elements in an implementation of software, hardware, or a combination of software and hardware into a residual-backpropagation sub-system not only can facilitate the residual operations for various data features but also can further perform residual analysis through different spaces, different dimensions, or different time intervals; thereby the sub-system can prevent the neural-network training model being destroyed from abnormal residuals caused by artificial data. This is the effect that cannot be achieved by a conventional technology.

Figure 5E:
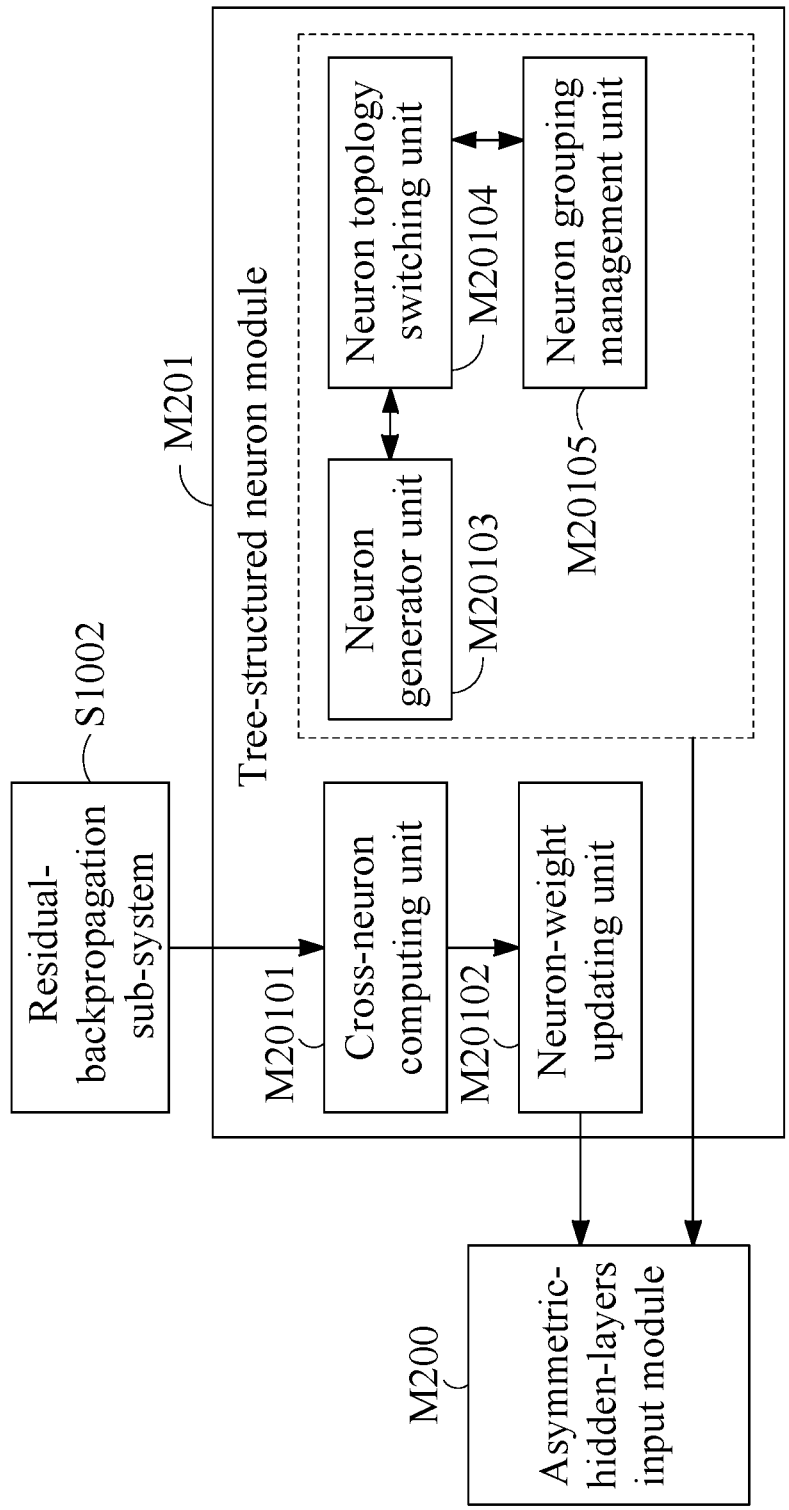
FIG. 5E is a block diagram of a tree-structured neuron module according to an embodiment of the present invention.

In an embodiment, referring to FIG. 5E, the above-mentioned tree-structured neuron module M201 of the neuro-computing sub-system S1001 comprises a cross-neuron computing unit U20101 and a neuron-weight updating unit U20102. The cross-neuron computing unit U20101 performs a neuron data updating process according to the residual-feedback data received by the neuro-computing sub-system S1001 from the progressive backpropagation output module M302 of the residual-backpropagation sub-system S1002, where the neuron data updating process mainly comprises the following steps: analyzing the received residual-feedback data, and determining whether one or more tree-structured data or weight parameter of specific neurons needs tuning to generate corresponding neuron updating data. However, the combination of above steps is only a feasible example of this process, so as to drive the tuning operations on a plurality of neurons with specific relations. The neuron-weight updating unit U20102 performs another neuron data updating process according to the neuron updating data, so as to update the tree-structured data and the weight parameter data for the neurons of the neural network, and notify the asymmetric-hidden-layers input module M200 to perform an updating process for the raw data in a pre-processing process. Combining these elements in an implementation of software, hardware, or a combination of software and hardware as a tree-structured neuron module not only can provide the effect of tuning weight parameters in the real time for the neural network, but also can facilitate to tune the neurons of the neural network dynamically, so as to be able to make the decision-making style be changed in the real time. This is the effect that cannot be achieved by a conventional technology.

In an embodiment, referring to FIG. 5E, in order to prevent being hacked or learned via external neural networks, the above-mentioned tree-structured neuron module M201 of the neuro-computing sub-system S1001 further comprises the following units: a neuron generator unit U20103, a neuron topology switching unit U20104, and a neuron grouping management unit U20105. The neuron generator unit U20103 performs a neuron generating process according to the instructions from the tree-structured neuron module M201, where the neuron generating process is creating new neurons on specific positions in the asymmetric hidden layers according to an index parameter and the weight parameter of the neuron nodes based on the received instructions, so as to generate the required nodes for corresponding new neurons in the neural network. Certainly, the combination of the above steps is only a feasible example of this process, and the invention is not limited thereto. The neuron topology switching unit U20104 performs a neuron topology switching process according to the instructions from the tree-structured neuron module M201, working with the neuron generator unit U20103, where the neuron topology switching process is calling the neuron generating process and the hidden-layered routing process according to a topology-structure parameter and a route-switching parameter based on the received instructions to perform topology switching operations for the neural network, so as to dynamically change the topology structure of the neural network. Certainly, the combination of the above steps is only a feasible example of this process, and the invention is not limited thereto. The neuron grouping management unit U20105 performs a neural-network reorganizing process for neuron nodes with various attributes, according to the instructions from the tree-structured neuron module M201, working with the neuron topology switching unit U20104, where the neural-network reorganizing process is calling one or more neuron topology switching processes according to a grouping parameter and the topology-structure parameter based on the received instructions to perform the switching operations on topology structure and propagation routes by group parallelly, so as to dynamically combine multiple neural networks with different topology structures. Certainly, the combination of the above steps is only a feasible example of this process, and the invention is not limited thereto. For example, the units U20101-U20105 mentioned in the above embodiment can be implemented with combinations of instruction codes applying procedures or functions, and can be packaged as specific function libraries coupled to CPU and memory units for performing processes/programs related to the above mentioned units U20101-U20105 (such as the neuron generating process, the neuron topology switching process, the neural-network reorganizing process, etc.). In an embodiment, referring to FIG. 5E, the above-mentioned units U20101-U20105 are packaged as a library of the tree-structured neuron module, where the library is installed in an embedded system and coupled to one or more processors of the embedded system for performing the above related processes. However, this embodiment is only a feasible example, and the implementation of U20101-U20105 is not limited thereto. For example, implementing the cross-neuron computing unit U20101 and the neuron-weight updating unit U20102 as two individual application programming interfaces (APIs) and integrating U20103-U20105 as a neuron management API is a practice of the present invention as well. Combining these elements in an implementation of software, hardware, or a combination of software and hardware into a tree-structured neuron module can achieve the effect of allocating various topology structures of neural networks speedily, so that the present invention not only can quickly switching between neural networks with different functions (such as switching between supervised and unsupervised neural networks, between memory and non-memory neural network, or between customized and open-source neural network), but also can prevent the structure of neural network being resolved or learned from external artificial intelligence (AI) systems. This is the effect that cannot be achieved by a conventional technology.

Figure 6:
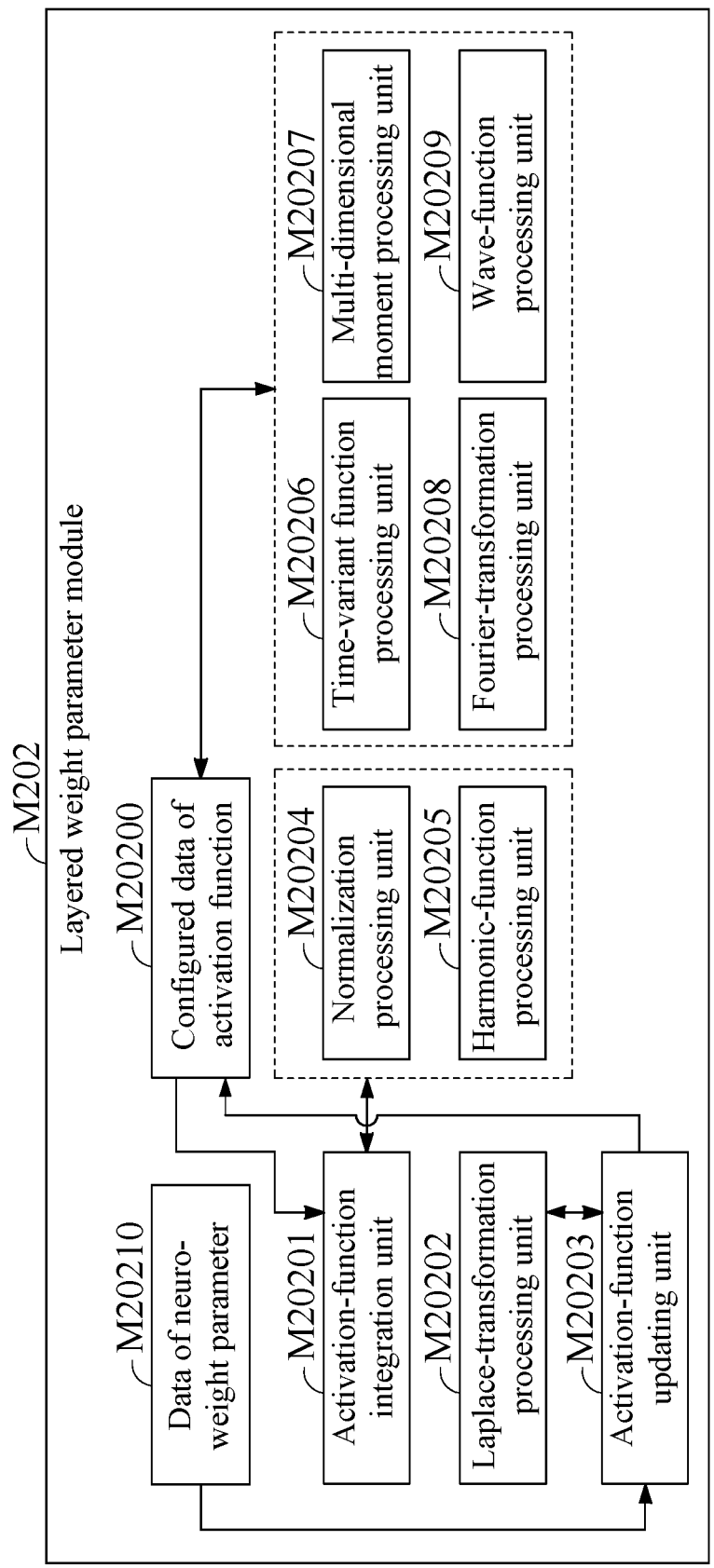
FIG. 6 is a block diagram of a layered weight parameter module according to an embodiment of the present invention.

Referring to FIG. 6, in an embodiment, the above-mentioned layered weight parameter module M202 of neuro-computing sub-system S1001 comprises: an activation-function integration unit U20201, a Laplace-transformation processing unit U20202, and an activation-function updating unit U20203. The activation-function integration unit U20201 can work with various activation functions to perform a setting process according to a configured data of activation function U20200 managed by the layered weight parameter module M202 and come out a setting result, so as to set an applicable activation function to a layered-weight parameter updating process for the neural network. The Laplace-transformation processing unit U20202 is for the raw data without time-variant features to perform a Laplace transformation process according to the activation function configured by the layered weight parameter module M202 and the data of neuro-weight parameter U20210 to generate a Laplace operation result. The activation-function updating unit U20203 performs an activation-function updating process to derive a configured data of activation function U20200 corresponding to the layered-weight parameter data according to the Laplace operation result, wherein the layered weight parameter module M202 can analyze and evaluate whether to coordinate the activation-function integration unit U20201 to reconfigure the corresponding activation function. For example, the configured data of activation function U20200 and the data of neuro-weight parameter U20210 mentioned in the above embodiment can be implemented as part of a storage device in the form of an encoded data in a storage media, and the other units U20201-U20203 can be packaged as a specific function library coupled to CPU and memory unit for performing the above units U20201-U20203 related processes (such as the activation-function setting process, the Laplace transformation process, activation-function updating process, etc). Combining these elements in an implementation of software, hardware, or a combination of software and hardware as a layered weight parameter module coupled to a storage unit where the configured data of activation function and the data of neuro-weight parameter can be stored in the storage unit not only can provide a variety of activation functions for the neural network so that the neuro-computing sub-system is able to switch to various neural networks with different functions, but also can quickly determine whether a configured activation function is applicable for the raw data without time-variant features. This is the effect that cannot be achieved by a conventional technology.

Referring to FIG. 6, in an embodiment, in order to enhance the generalization ability of the neural network, the above-mentioned layered weight parameter module M202 of neuro-computing sub-system S1001 further comprises the following units: a normalization processing unit U20204, a harmonic-function processing unit U20205, a time-variant function processing unit U20206, a multi-dimensional moment processing unit U20207, a Fourier-transformation processing unit U20208, and a wave-function processing unit U20209. The normalization processing unit U20204 is for unbounded activation function to optimize the performance of hidden layers, wherein the layered weight parameter module M202 can drive the normalization processing unit U20204 according to the setting result from the activation-function integration unit U20201, to perform a normalization processing program before the raw data being introduced to an unbounded activation function. In addition, the harmonic-function processing unit U20205 is for the raw data that has phasing properties or can be expressed on a complex plane, wherein the layered weight parameter module M202 can drive the harmonic-function processing unit according to the setting result from the activation-function integration unit U20201, to perform a harmonic-function mapping process, where the harmonic-function mapping process mainly comprises the following steps: expressing the selected activation function as a holomorphic function f on a Riemannian manifold, obtaining a harmonic function via making use of the Laplace operator $\Delta$ to define $\Delta f=0$, and configuring the harmonic function as an updated activation function meanwhile adopting the interval corresponding to the extremum of the harmonic function as the effective interval of the updated activation function, so as to make the configured activation function support the raw data which is in the form of complex number. Certainly, the combination of the above steps is only a feasible example of this process, and the invention is not limited thereto. The time-variant function processing unit U20206 is driven to import time variables to the configured activation function if the layered weight parameter module M202 determines that the hidden layer is unable to avoid gradient vanishing problem or gradient exploding problem according to the configured data of activation function U20200, so as to facilitate the result of weight adjustment tending to converge.

In an embodiment, the multi-dimensional moment processing unit U20207 is driven to introduce an affine transformation process for a moment generating function to the configured activation function according to the configured data of activation function U20200 if the layered weight parameter module M202 determines that the raw data fits the property of multi-variant continuous random variables. Here, for example, the affine transformation process mainly comprises the following steps: importing the multi-variables of the raw data into the joint moment-generating function of a random vector z ($m_z(t)=E[exp(t^Tz)]$), in the condition of z being a p-dimensional random vector, setting $\mu$ as a p-dimensional constant vector, and B as a reversible matrix of order p*p, performing an affine transformation on z with x=Bz+$\mu$, replacing z with x in the above moment-generating function, and deriving the probability density function of each variable based on the affine transformed moment-generating function, so as to introduce the probability factors of multiple variables into the operations of weight adjustment/tuning to facilitate the result of weight adjustment/tuning tending to converge. Certainly, the combination of the above steps is only a feasible example of this process, and the invention is not limited thereto. The Fourier-transformation processing unit U20208 is driven to perform a Fourier-transformation process on the data propagated by the hidden layers via making use of the Dirac δ-function to obtain a transformed data if the layered weight parameter module M202 determines that the raw data has the distribution property of the Dirac δ-function according to the configured data of activation function U20200, thereby the Fourier-transformation processing unit U20208 uses a ramp function as an activation function to import the transformed data into the activation function, for supporting the raw data with particle properties or the raw data in zero dimension. If the layered weight parameter module M202 determines that the raw data has the distribution property of a quantum many-body system, the wave-function processing unit U20209 will be driven to perform a wave-function processing program to use an applicable wave function as the configured activation function according to the configured data of activation function U20200, so as to facilitate the result of weight adjustment/tuning for quantum many-body system simulation tending to converge.

For example, the units U20204-U20209 mentioned in the above embodiment can be implemented with combinations of instruction codes applying procedures or functions, and can be packaged as specific function libraries coupled to CPU and memory units for performing processes/programs related to the above mentioned units U20204-U20209 (such as the normalization processing program, the affine transformation process, the Fourier-transformation process, etc.). In an embodiment, as shown in FIG. 6, the above-mentioned units U20200-U20210 can be packaged as a specific function library of the layered weight parameter module installed in an embedded system coupled to one or more processors of the embedded system for performing the above related processes/programs. However, this embodiment is only a feasible example of the present invention, and the implementation of the units U20201-U20209 is not limited thereto. For example, implementing the activation-function integration unit U20201, the Laplace-transformation processing unit U20202 and the activation-function updating unit U20203 as three individual APIs, meanwhile integrating the normalization processing unit U20204 and the harmonic-function processing unit U20205 into an add-on-for-activation API, and combining U20206-U20209 as an advanced-transform-for-activation API is also a practice based on the present invention. Combining these elements in an implementation of software, hardware, or a combination of software and hardware into a layered weight parameter module not only can enhance the operation performance of the hidden layers, but also can make a conventional activation function be able to support the raw data in the form of complex number, and facilitates the result of weight adjustment/tuning tending to converge, during the neural-network training process for a variety of data set with special properties. This technology effectively solves the issue that the training results of conventional neural networks are difficult to converge due to the native restrictions related to the activation function when the data variable dimension is too high or too low. This is the effect that cannot be achieved by a conventional technology.

Figure 7:
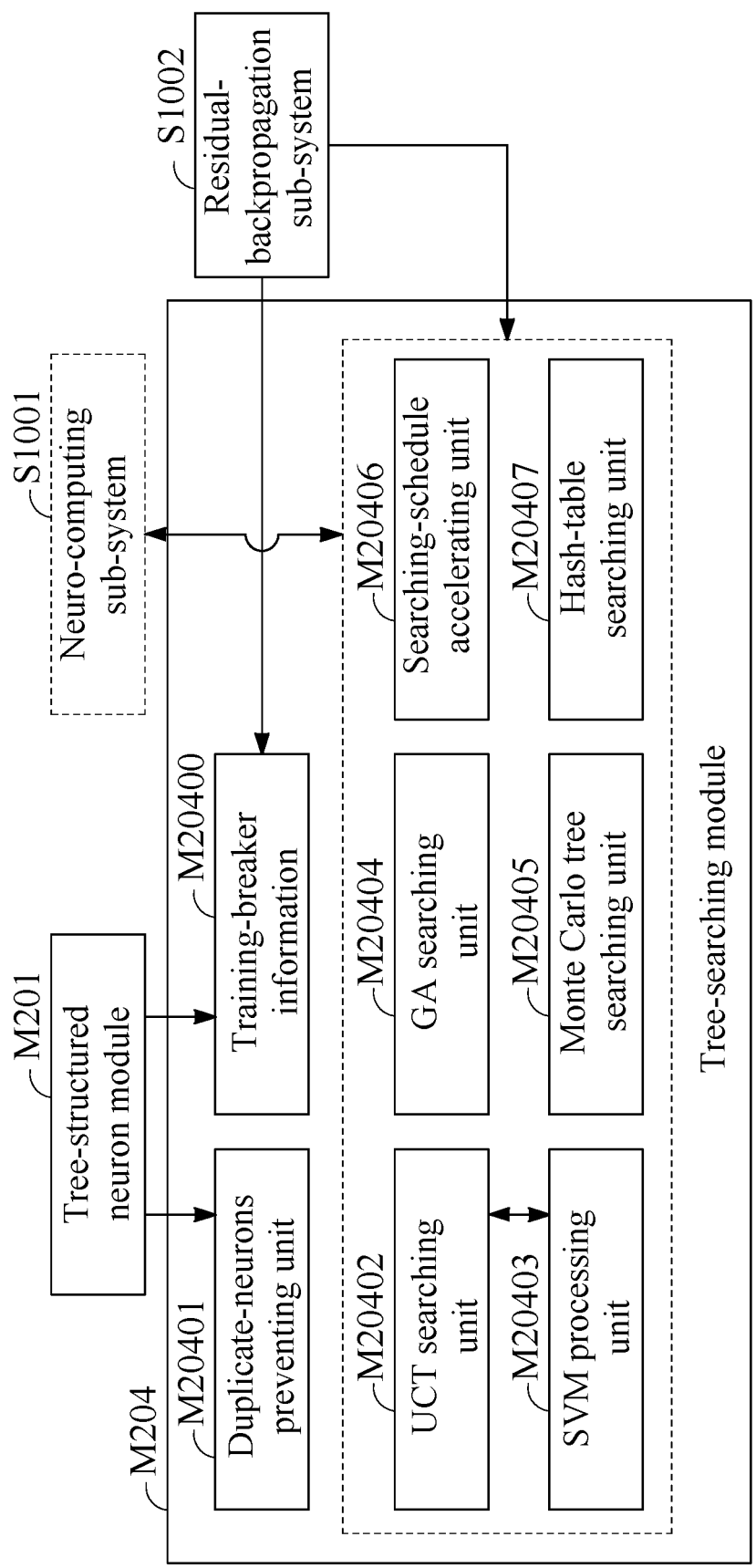
FIG. 7 is a block diagram of a tree-searching module according to an embodiment of the present invention.
Figure 9:
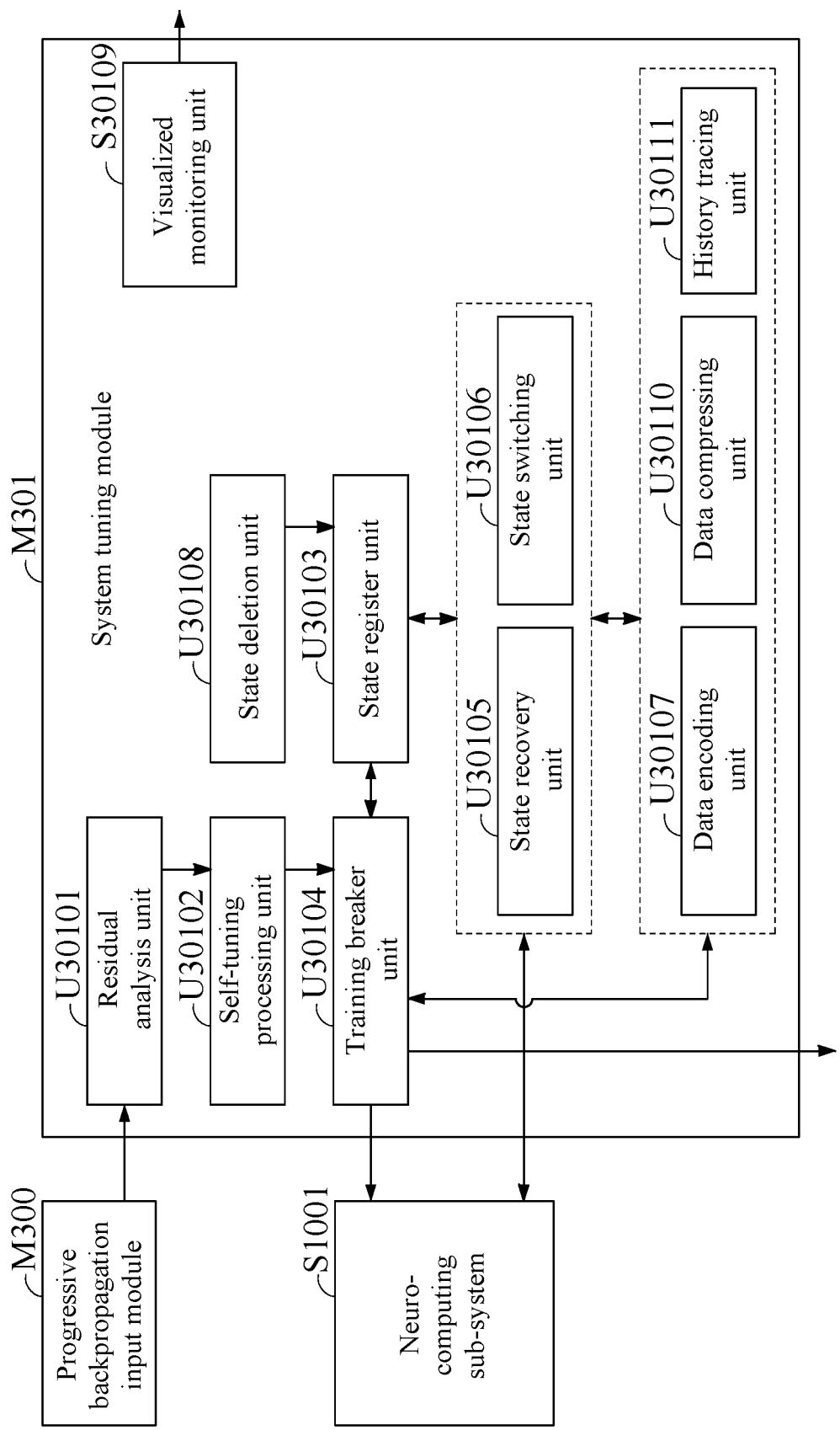
FIG. 9 is a block diagram of a system tuning module according to an embodiment of the present invention.

Thereafter referring to FIG. 7, in an embodiment, the above-mentioned tree-searching module M204 of the neuro-computing sub-system S1001 comprises a duplicate-neurons preventing unit U20401 and a UCT searching unit U20402. The duplicate-neurons preventing unit U20401 determines whether there are duplicate neuron nodes according to the tree-structured data derived by the tree-structured neuron module M201 of neuro-computing sub-system S1001, wherein the duplicate-neurons preventing unit U20401 derives a duplicated-neuron information if there are duplicate neurons, thereby the tree-searching module M204 can drive the state register unit U30103 of the residual-back-propagation sub-system S1002A (as shown in FIG. 9) to derive a corresponding training-breaker information U20400, so that the neuro-computing sub-system S1001 can coordinate the tree-structured neuron module M201 of the neuro-computing sub-system S1001 according to the training-breaker information U20400, to perform a training-break mechanism. The UCT searching unit U20402 performs a UCB computing process based on the system tuning information from the residual-backpropagation sub-system S1002A and the raw data, tree-structured data, weight-parameter data, and non-linear analyzed data of the neuro-computing sub-system S1001, to generate a corresponding upper-confidence-bound (UCB) information. In addition, the system tuning information is for determining whether the weight-parameter data needs tuning, and then U20402 performs a simulation to update the tree-structured data based on the weight-parameter data which needs tuning, and then obtains a simulated non-linear analyzed data, and then determines whether the result of the simulation tends to converge according to the simulated non-linear analyzed data, meanwhile performs a UCT analysis based on the raw data and the tree-structured data to come out the UCB information; thereby the tree-searching module M204 determines whether the trend of convergence fit the UCB information in accordance with the result derived from the UCB information and the system tuning information. If the trend of convergence does not fit the UCB information, M204 will coordinate the state register unit U30103 of the residual-backpropagation sub-system S1002A to derive a corresponding training-breaker information U20400, so that the neuro-computing sub-system S1001 can coordinate the tree-structured neuron module M201 of the sub-system S1001 according to the training-breaker information U20400, to perform a training-break mechanism. Combining these elements in an implementation of software, hardware, or a combination of software and hardware into a tree-searching module not only prevents the invalid training processes from consuming system resources, but also further controls the distribution interval of decision-making data, and avoids wasting too much system resources in unnecessary analysis processes for deriving decision-making data.

Still referring to FIG. 7, in an embodiment, in order to enhance the tree-searching performance, the above-mentioned tree-searching module M204 of the neuro-computing sub-system S1001 further comprises the following units: an SVM processing unit U20403, a GA searching unit U20404, a Monte Carlo tree searching unit U20405, a searching-schedule accelerating unit U20406, and a hash-table searching unit U20407. The SVM (support vector machine) processing unit U20403 is driven to perform a hyperplane optimization process if the tree-searching module M204 determines the current upper-confidence-bound is out of an applicable range according to the UCB information derived from the UCT searching unit U20402, so as to adjust the decision-making boundary and optimize the upper-confidence-bound for avoiding too many invalid searching processes. In addition, the GA searching unit U20404 is driven to perform a genetic-algorithm computing process for a neural network composed of a variety of topological structures, where the genetic-algorithm computing process is making use of genetic algorithm to group the neuron nodes for determining a target group, thereafter to perform a tree-structured data searching process on the target group, so that the tree-searching module M204 can effectively simplify the searching scope. Moreover, the Monte Carlo tree searching unit U20405 is driven to perform an MCTS process for a neural network composed of a tree-structured topology with a large depth, so that the tree-searching module M204 can enhance the tree-searching performance through heuristic-searching processes, for better paths. The searching-schedule accelerating unit U20406 is driven to perform a B+tree searching process in a file system embedded with B+tree file structure, for a neural network composed of a tree-structured topology with a large width, so that the tree-searching module M204 can perform the searching schedule with B+tree searching algorithm, which can effectively save the search time. The hash-table searching unit U20407 is driven to store indexes in a hash table and perform an index-searching process with hash-searching algorithm, for a neural network composed of a tree-structured topology with a large number of indexes, so that the tree-searching module M204 can effectively save search time.

For example, the units U20401-U20407 mentioned in the above embodiment can be implemented with combinations of instruction codes applying procedures or functions, and can be packaged as specific function libraries coupled to CPU and memory units for performing processes/programs related to the above mentioned units U20401-U20407 (such as the hyperplane optimization process, the genetic-algorithm computing process, the UCB computing process, etc.). In an embodiment, as shown in FIG. 7, the above-mentioned units U20401-U20407 can be packaged as a specific function library of the tree-searching module installed in an embedded system coupled to one or more processors of the embedded system for performing the above related processes/programs. However, this embodiment is only a feasible example of the present invention, and the implementation of the units U20401-U20407 is not limited thereto. For example, implementing the duplicate-neurons preventing unit U20401 as an individual API, meanwhile integrating UCT searching unit U20402 and the hash-table searching unit U20407 into a searching-performance-enhancement API, is also a practice based on the present invention. Combining these elements in an implementation of software, hardware, or a combination of software and hardware into a tree-searching module not only solves the problem of searching performance when a neural network adopts neurons with tree-structured data, but also effectively avoids the large amount of system memory occupation, so that makes the neuron nodes with tree-structured data be feasible in consideration of industrial utilization.

Thereafter referring to FIG. 9, in an embodiment, the above-mentioned system tuning module M301 of the residual-backpropagation sub-system S1002A comprises: a residual analysis unit U30101, a self-tuning processing unit U30102, a state register unit U30103, and a training breaker unit U30104. The residual analysis unit U30101 with more than one residual computing program (such as mean square error (MSE), least square error (LSE), most likelihood error (MLE), etc., the above are only part of examples and the feasible residual computing programs of the present invention are not limited thereto) can perform an applicable residual computing program according to the non-linear analyzed data imported by the progressive backpropagation input module M300 to generate a residual analysis data. The self-tuning processing unit U30102 performs a self-tuning processing program based on the non-linear analyzed data and the residual analysis data, with an adaptive residual analysis for a backpropagation of residual compensation, to derive a system tuning information, wherein the system tuning information is for fine-tuning the neural network or for triggering a training-break mechanism. In addition, the system tuning module M301 can store more than one break-configuration switching data in the state register unit U30103 according to the system-state data. The training breaker unit U30104 determines whether a training-break condition is met in accordance with the system tuning information from the self-tuning processing unit U30102, wherein the training breaker unit U30104 will work with the state register unit U30103 if the training-break condition is met, to generate a training-breaker information according to a selected break-configuration switching data, thereby the residual-backpropagation sub-system S1002A can further coordinate the neuro-computing sub-system S1001A to perform a training-break mechanism according to the training-breaker information. Combining these elements in an implementation of software, hardware, or a combination of software and hardware as a system tuning module, not only a proper system tuning mechanism can be introduced to enhance the applicability of the decision-making data, but also adopting a training-break mechanism can effectively ensure that the individuality of the decision-making data is not destroyed. This technology actually avoids the problem that the conventional unsupervised neural network may frequently eigenize the features of non-important data during the training process so that the final derived decision-making data tends to be ordinary.

Referring to FIG. 9, in an embodiment, in order to enhance the management for training states and system tuning information, the above-mentioned system tuning module M301 of the residual-backpropagation sub-system S1002A further comprises the following units: a state recovery unit U30105, a state switching unit U30106, a data encoding unit U30107, a state deletion unit U30108, a visualized monitoring unit U30109, a data compressing unit U30110, and a history tracing unit U30111. For example, the state recovery unit U30105 is for a system that has already performed a training-break mechanism, wherein if the factor that caused the training-break has been eliminated, the state recovery unit U30105 will be driven to perform a state recovery process which is to facilitate the system to restore a normal state which is before the training-break mechanism is triggered, according to the break-configuration switching data stored in the state register unit U30103. The state switching unit U30106 is driven to perform a state switching process according to the break-configuration switching data stored in the state register unit U30103 if the current decision-making result is more degraded than the previous decision-making result or there are multiple types of raw data that must be switched, so as to facilitate the system to switch to a previous state which is more applicable. The data encoding unit U30107 is for enhancing the confidentiality of system tuning information, residual-feedback data, or training-breaker information during transmission, wherein the data encoding unit U30107 is driven to perform an encoding process (such as encryption, transcoding, neural encoding, etc., the above operations are only for example, and the feasible encoding process of the present invention is not limited thereto) on the system tuning information, residual-feedback data or training-breaker information, so as to reduce the risk of leaking sensitive information. Moreover, the state deletion unit U30108 is driven to perform a deletion process for required specific system state (such as a state to mean that the system cannot eliminate an intrusive behavior in time) to avoid the leakage of the parameters related to important training states in an event of system intrusion, so as to reduce the risk of leaking sensitive information. In addition, the visualized monitoring unit U30109 is driven to perform a visualized interface process on a specific monitor device for providing a system administrator a remote monitoring mechanism. Meanwhile, the data compressing unit U30110 is driven to perform a data compressing process on an output data to facilitate the transmission for system tuning information, residual-feedback data or training-breaker information between different modules through different devices, so as to enhance the efficiency of bandwidth utilization between different transmission devices. The history tracing unit U30111 is driven to perform a history tracing mechanism for data stream in transmission to enhance data security and avoid a large number of repeated decision-making processes, thereby the system tuning module M301 can find out abnormal transmission data via reviewing history logs.

For example, the unit U30103 mentioned in the above embodiment can be implemented as part of at least one storage device, and the storage device can be a disk device or a non-volatile memory device or a persistent memory circuit; the other units (U30101-U30102 and U30104-U30111) can be implemented with combinations of instruction codes applying procedures or functions, and can be packaged as specific virtual machine copy coupled to CPU and memory units for performing processes/mechanisms related to the above mentioned units (U30101-U30102 and U30104-U30111) (such as the state recovery process, the data compressing process, the history tracing mechanism, etc.). In an embodiment, as shown in FIG. 9, the above-mentioned units (U30101-U30102 and U30104-U30111) can be packaged as a VM copy of the system tuning module integrated in a server-virtualization platform coupled to one or more processors of the server-virtualization platform for performing the above related processes/mechanisms. However, this embodiment is only a feasible example of the present invention, and the implementation of the units (U30101-U30102 and U30104-U30111) is not limited thereto. For example, implementing the residual analysis unit U30101, the self-tuning processing unit U30102, the training breaker unit U30104, the state deletion unit U30108, and the visualized monitoring unit U30109 as five individual RESTful APIs, meanwhile integrating U30105 and U30106 as a state-management RESTful API, and combining U30107, U30110, and U30111 into a data-stream-management RESTful API, so as to provide a cloud platform to launch a cloud service, is also a practice based on the present invention. Combining these elements in an implementation of software, hardware, or a combination of software and hardware into a system tuning module provides security network transmission for important or sensitive data stream, thereby not only the neuro-computing sub-system and the residual-backpropagation sub-system can be deployed in different places to spread risks, but also can provide an effective maintenance and management mechanism for valuable decision-making data, so that the present invention can be implemented as a neural network artificial intelligence decision-making core system with a security protection design, which is an effect that cannot be achieved by a conventional technology.

Figure 3B:
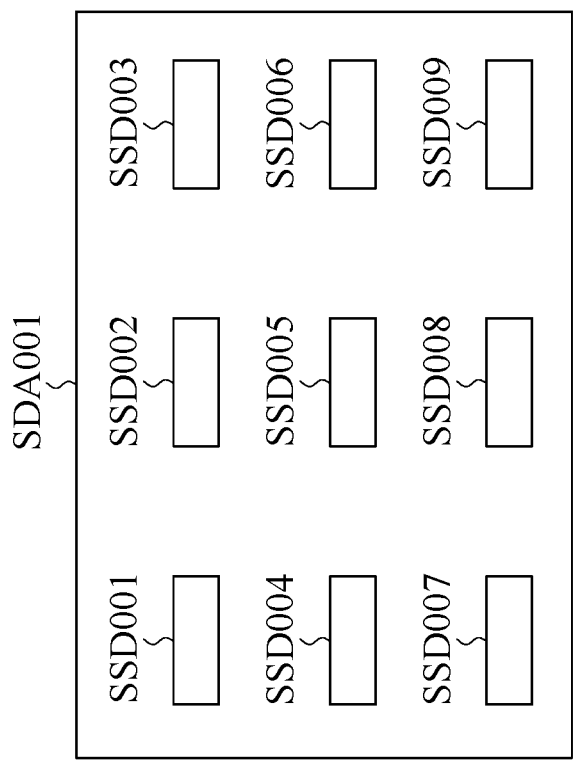
FIG. 3B is a schematic diagram of the unsupervised neural-network interface module according to an embodiment of the present invention.
Figure 3A:
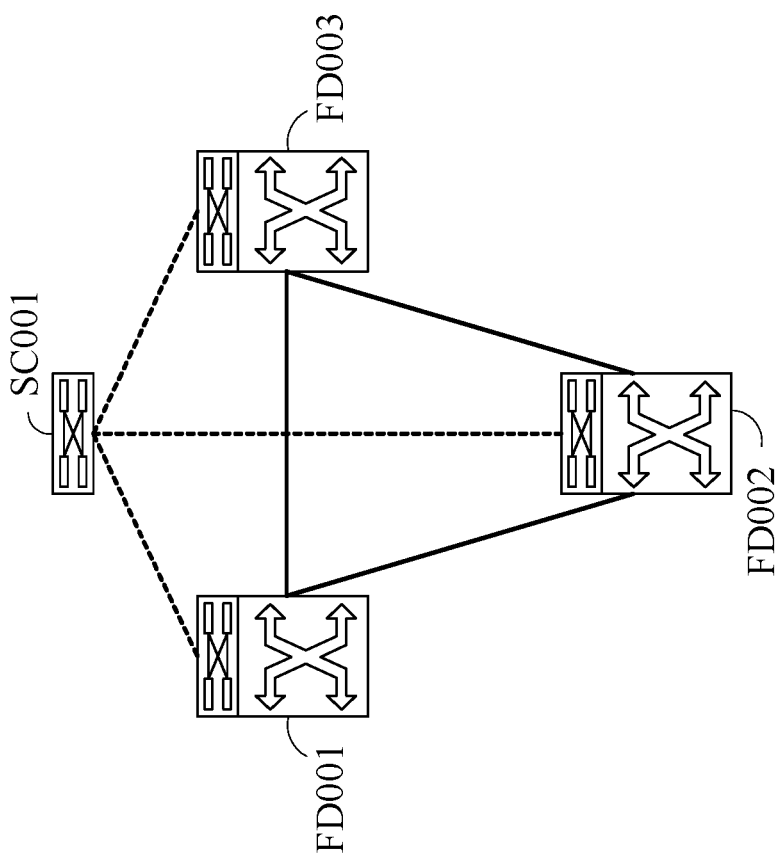
FIG. 3A is a schematic diagram of the system according to an embodiment of the present invention.
Figure 3D:
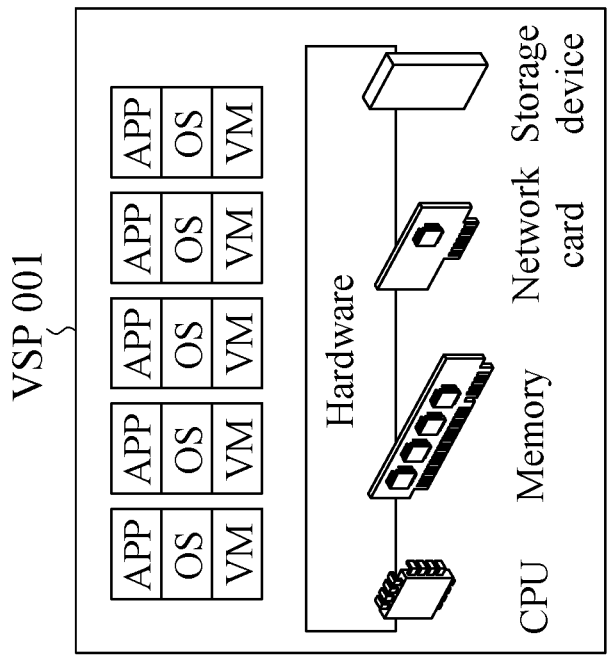
FIG. 3D is a structural block diagram of a server-virtualization platform according to an embodiment of user scenario.
Figure 3C:
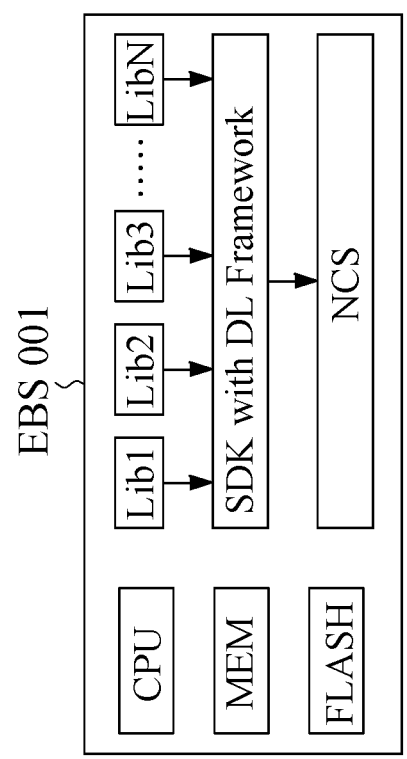
FIG. 3C is a schematic diagram of the neuro-computing sub-system according to an embodiment of the present invention.

Finally, refer to FIG. 3A, which is a schematic diagram of the system according to an embodiment of the present invention. Here also refer to FIG. 1 to describe the implementation of a basic system. As shown in FIG. 3B, in an embodiment, the unsupervised neural-network interface module M100 of the system S1000 is implemented as a disk array server DA001. The server has a disk array management unit and the received trained data set is divided to be stored into several parts of the disk array through a random-storage algorithm, where the disk array comprises, for example, a plurality of solid-state hard disks, as represented by SSD001, SSD002 to SSD009 in FIG. 3B. As shown in FIG. 3C, in an embodiment, the neuro-computing sub-system S1001 is implemented as an embedded system EBS001 integrated with an NCS (neural compute stick). Each module of the sub-system S1001 integrates with the software development kit (SDK) of the embedded system EBS001 in the form of different library packages (e.g., represented by Lib1, Lib2, Lib3-LibN) and built-in as a part of the storage unit (such as flash memory, FLASH) of the embedded system EBS001 coupled to the CPU of EBS001 to perform the S1001 related processes/programs/mechanisms. As shown in FIG. 3D, in an embodiment, the residual-backpropagation sub-system S1002 is implemented as a server-virtualization platform VSP001. Each module of the sub-system S1002 integrates with the server-virtualization platform VSP001 in the form of different VM copies and there is a virtual machine to be a monitor-and-management unit for coordinating other VMs through internal virtual network segments to perform the above-mentioned sub-system S1002 related processes/programs/mechanisms. In addition, in an embodiment, as shown in FIG. 3B-3D, DA001, EBS001, and VSP001 can all be based on a system network managed by an SDN (software-defined network) controller SC001 as shown in FIG. 3A, and are all configured as forwarding devices. For example, DA001 is configured as forwarding device FD001, EBS001 is configured as forwarding device FD002, and VSP001 is configured as forwarding device FD003. Meanwhile, DA001, EBS001 and VSP001 perform data stream transmission through the decoupled control mechanism of SDN. However, this embodiment is only a feasible example, the implementation of the unsupervised neural-network interface module M100, the neuro-computing sub-system S1001, and the residual-backpropagation sub-system S1002 is not limited thereto. For example, implementing M100, S1001, and S1002 with cloud servers of Amazon Web Services (AWS) or Azure is also an implementation based on the present invention.

While the present disclosure has been described by means of specific embodiments, numerous modifications and variations could be made thereto by those skilled in the art without departing from the scope and spirit of the present disclosure set forth in the claims.

What is claimed is:

1. An artificial-intelligence decision-making core system with neural network, the system comprising:
    an unsupervised neural-network interface module which comprises at least a computing device for receiving raw data, wherein an interface of the unsupervised neural-network interface module for receiving the raw data is applicable for trained data from external non-specific models;
    a neuro-computing sub-system which comprises at least a computing device coupled to the unsupervised neural-network interface module, wherein the neuro-computing sub-system is configured to perform a pre-processing computing process on the raw data for obtaining pre-processed data, and then to perform a neuron operation process capable of dynamically updating neuron node, and then to derive corresponding non-linear analyzed data and decision-making data, via a non-linear principle component analysis (PCA) computing process; and
    a residual-backpropagation sub-system, in cooperation with the neuro-computing sub-system, for performing a residual compensation computing process based on the non-linear analyzed data to generate system tuning information and residual-feedback data, or training-breaker information, and to deliver the system tuning information and the residual-feedback data, or the training-breaker information to the neuro-computing sub-system, so as to facilitate the neuro-computing sub-system to derive decision-making data with individuality and applicability;
    wherein the neuro-computing sub-system comprises:
        an asymmetric-hidden-layers input module, for performing a data pre-processing program on the raw data sent from the unsupervised neural-network interface module of the artificial-intelligence decision-making core system, to derive pre-processed data;
        a tree-structured neuron module, coupled to the asymmetric-hidden-layers input module, including a plurality of neuron-node data, wherein the tree-structured neuron module is configured to perform a tree-structured data processing program based on the received pre-processed data, so as to generate tree-structured data corresponding to each neuron node;
        a layered weight parameter module, coupled to the tree-structured neuron module, for performing a layered weight parameter computing process according to the tree-structured data, so as to obtain layered weight parameter data for managing a specific weight of each hidden layer in neural network;
        a non-linear PCA module, coupled to the layered weight parameter module, for performing a non-linear PCA computing process according to the layered weight parameter data for deriving non-linear analyzed data, wherein the non-linear PCA module is configured to derive applicable decision-making data based on the non-linear analyzed data or is configured to work with the residual-feedback data from the residual-backpropagation sub-system so as to improve the decision-making data; and
        a tree-searching module, coupled to the tree-structured neuron module and the residual-backpropagation sub-system, for breaking a training process of the neural network at once to maintain the differentiation and the applicability of the decision-making data.

2. The artificial-intelligence decision-making core system with neural network according to claim 1, wherein in order to enhance the decision-making quality of the core system, the neuro-computing sub-system further comprises:
    a hidden-layered routing module for receiving the raw data from the unsupervised neural-network interface module of the decision-making core system, and planning a route for the hidden layers according to attributes of the raw data, so that the neuro-computing sub-system supports variable propagation paths for the hidden layers of the neural network dynamically;
    a dense data processing module for analyzing the raw data from the unsupervised neural-network interface module of the decision-making core system and perform a dense data processing program for dropping invalid data if there is a high-density attribute with the raw data, and normalizing duplicate data, and then importing the output data which has completed the dense data processing program, into the asymmetric-hidden-layers input module of the neuro-computing sub-system;
    a sparse tensor processing module, coupled to the tree-structured neuron module of the neuro-computing sub-system, for verifying whether derived neuron nodes fit conditions of sparse tensor, wherein when neurons of the neural network are in a condition of sparse tensor, the sparse tensor processing module performs a sparse matrix operation process to facilitate computing performance and save system memory usage;
    a Chaos model analysis module, coupled to the non-linear PCA module of the neuro-computing sub-system, for performing a Chaos model analysis process to facilitate derivation of the decision-making data, when the non-linear PCA module cannot make effective corrections according to the residual-feedback data sent from the residual-backpropagation sub-system; and
    a neuron dimension switching module, coupled to the tree-structured neuron module, for performing a neuron dimension switching process based on system tuning information from the residual-backpropagation sub-system, to facilitate switching of decision-making style, so that the neuron dimension switching module is capable of enhancing the differentiation and applicability of the decision-making data.

3. The artificial-intelligence decision-making core system with neural network according to claim 1, wherein the residual-backpropagation sub-system comprises:
    a progressive backpropagation input module for receiving non-linear analyzed data from the non-linear PCA module;
    a system tuning module to perform a residual compensation computing process for the non-linear analyzed data, to derive feedback-tuning information, and to trigger a training-break mechanism of neural network according to the feedback-tuning information or deliver the feedback-tuning information; and
    a progressive backpropagation output module, based on an updated state of the system tuning module and the derived feedback-tuning information, to derive residual-feedback data and send the residual-feedback data to the non-linear PCA module of the neuro-computing sub-system for facilitating the neuro-computing sub-system to maintain the differentiation and applicability of the decision-making data.

4. The artificial-intelligence decision-making core system with neural network according to claim 3, wherein in order to enhance the processing ability for non-linear analyzed data, the residual-backpropagation sub-system further comprises:

a dynamic-norm processing module for non-linear analyzed data that is capable of being vectorized or matrixed, wherein the progressive backpropagation input module of the residual-backpropagation sub-system is configured to further coordinate the dynamic-norm processing module to perform a pre-processing program to import the vectorized data or matrixed data to the system tuning module for operation of residual-compensation mechanism;

wherein if the non-linear analyzed data reveals that most of the layered weights are in a large scale, the progressive backpropagation input module of the residual-backpropagation sub-system further coordinates the dynamic-norm processing module to perform a re-initialization process to implement a norm-penalty mechanism for hidden layers to re-initialize related weight parameters of the neural network for reducing possible overfitting;

an inner-product processing module for vectorized data or matrixed data with image properties, wherein the progressive backpropagation input module of the residual-backpropagation sub-system is further configured to coordinate the inner-product processing module to perform another pre-processing program to self-define the relationship between nodes and vectors, so as to introduce standard orthogonal basis to the system tuning module to improve the operation of residual-compensation mechanism;

a manifold operation module for non-Euclidean space data, wherein the progressive backpropagation input module of the residual-backpropagation sub-system is configured to further coordinate the manifold operation module to perform another pre-processing program to switch the non-Euclidean space data into a form of Euclidean space, so as to import sampling data from various geometry spaces to the system tuning module to enhance the applicability of residual-compensation mechanism;

a tensor switching module for time-variant data, wherein the system tuning module of the residual-backpropagation sub-system is configured to further coordinate the tensor switching module to perform a self-correction process to switch the residual data already processed by residual-compensation mechanism through various dimensional spaces, so as to find the optimal residual-operation space that is most feasible for the time-variant data to enhance the applicability of residual-compensation mechanism;

a functional operation module for a computing process of obtaining the optimal solution of loss function via making use of boosting algorithm, wherein the system tuning module of the residual-backpropagation sub-system is configured to further coordinate the functional operation module to perform a mathematical programming process with functional operations, to facilitate derivation of the optimal solution of the loss function, so as to maintain accuracy of the residual-compensation mechanism; and an ARIMA-model processing module for non-stationary residual data, wherein the system tuning module of the residual-backpropagation sub-system is configured to further coordinate the ARIMA-model processing module to perform a stationary process through integrated finite-difference operations to obtain stationary residual data, so as to check whether the stationary residual data fits a white-noise sequence to confirm whether original non-stationary residual data needs to be corrected.

5. The artificial-intelligence decision-making core system with neural network according to claim 1 or 3, wherein the tree-structured neuron module of the neuro-computing sub-system further comprises:

a cross-neuron computing unit for performing a neuron data updating process according to the residual-feedback data received by the neuro-computing sub-system from the progressive backpropagation output module of the residual-backpropagation sub-system, so as to generate corresponding neuron updating data; and a neuron-weight updating unit for performing another neuron data updating process according to the neuron updating data, so as to update the tree-structured data and the weight parameter data for neurons of the neural network, and notify the asymmetric-hidden-layers input module to perform an updating process for the raw data in a pre-processing process.

6. The artificial-intelligence decision-making core system with neural network according to claim 2 or 4, wherein in order to prevent being hacked or learned via external neural networks, the tree-structured neuron module of the neuro-computing sub-system further comprises:

a neuron generator unit for performing a neuron generating process according to instructions from the tree-structured neuron module, so as to generate the required nodes for corresponding neurons;

a neuron topology switching unit for performing a neuron topology switching process according to the instructions from the tree-structured neuron module, working with the neuron generator unit, so as to dynamically change the topology structure of the neural network; and a neuron grouping management unit for performing a neural-network reorganizing process for neuron nodes with various attributes, according to the instructions from the tree-structured neuron module, working with the neuron topology switching unit, so as to dynamically combine multiple neural networks with different topology structures.

7. The artificial-intelligence decision-making core system with neural network according to claim 1, wherein the layered weight parameter module of the neuro-computing sub-system further comprises:

an activation-function integration unit for working with various activation functions to perform a setting process according to configured data of activation function managed by the layered weight parameter module and come out a setting result, so as to set an applicable activation function to a layered-weight parameter updating process for the neural network;

a Laplace-transformation processing unit for performing a Laplace transformation process according to the activation function configured by the layered weight parameter module and the weight-parameter data of the neurons to generate a Laplace operation result; and an activation-function updating unit for performing an activation-function updating process to derive a configured data of activation function corresponding to the layered-weight parameter data according to the Laplace operation result, wherein the layered weight parameter module is configured to analyze and evaluate whether to coordinate the activation-function integration unit to reconfigure the corresponding activation function.

8. The artificial-intelligence decision-making core system with neural network according to claim 7, wherein in order to enhance the generalization ability of the neural network, the layered weight parameter module of the neuro-computing sub-system further comprises:

a normalization processing unit for optimizing performance of hidden layers, wherein the layered weight parameter module is configured to drive the normalization processing unit according to the setting result from the activation-function integration unit, to perform a normalization processing program for an unbounded activation function;

a harmonic-function processing unit for the raw data that has phasing properties or is expressed on a complex plane, wherein the layered weight parameter module is configured to drive the harmonic-function processing unit according to the setting result from the activation-function integration unit, to perform a harmonic-function mapping process, so that the configured activation function is capable of supporting data which is in a form of complex number;

a time-variant function processing unit configured to be driven to import time variables to the configured activation function if the layered weight parameter module determines that the hidden layer is unable to avoid gradient vanishing problem or gradient exploding problem according to the configured data of activation function, so as to facilitate a result of weight adjustment tending to converge;

a multi-dimensional moment processing unit configured to be driven to introduce an affine transformation process for a moment generating function to the configured activation function according to the configured data of activation function if the layered weight parameter module determines that the raw data fits the property of multi-variant continuous random variables, so as to facilitate the result of weight adjustment tending to converge;

a Fourier-transformation processing unit configured to be driven to perform a Fourier-transformation process on the data propagated by the hidden layers via making use of the Dirac delta function to obtain a transformed data if the layered weight parameter module determines that the raw data has the distribution property of the Dirac delta function according to the configured data of activation function, thereby the Fourier-transformation processing unit uses a ramp function as an activation function to import the transformed data into the activation function, for supporting the raw data with particle properties or the raw data in zero dimension; and a wave-function processing unit configured to be driven to perform a wave-function processing program to use an applicable wave function as the configured activation function according to the configured data of activation function if the layered weight parameter module determines that the raw data has distribution property of a quantum many-body system, so as to facilitate the result of weight adjustment for quantum many-body system simulation tending to converge.

9. The artificial-intelligence decision-making core system with neural network according to claim 1 or 3, wherein the tree-searching module of the neuro-computing sub-system further comprises:

a duplicate-neurons preventing unit for determining whether there are duplicate neuron nodes according to the tree-structured data derived by the tree-structured neuron module of neuro-computing sub-system, wherein the duplicate-neurons preventing unit derives a duplicated-neuron information if there are duplicate neurons, so that the tree-searching module is capable of driving a state register unit of the residual-backpropagation sub-system to derive a corresponding training-breaker information, so that the neuro-computing sub-system coordinates the tree-structured neuron module of the neuro-computing sub-system according to the training-breaker information, to perform a training-break mechanism; and an upper confidence bounds applied to trees (UCT) searching unit for performing an upper confidence bound (UCB) computing process based on the system tuning information from the residual-backpropagation sub-system and the raw data, tree-structured data, weight-parameter data, and non-linear analyzed data of the neuro-computing sub-system, to generate a corresponding upper-confidence-bound information, wherein the tree-searching module determines whether the current neural network does not fit the UCB information and coordinate the state register unit to derive a training-breaker information if it does not, so that the neuro-computing sub-system is enabled to coordinate the tree-structured neuron module of the sub-system according to the training-breaker information, to perform a training-break mechanism.

10. The artificial-intelligence decision-making core system with neural network according to claim 2 or 4, wherein in order to enhance the tree-searching performance, the tree-searching module of the neuro-computing sub-system further comprises:

a support vector machine (SVM) processing unit configured to be driven to perform a hyperplane optimization process if the tree-searching module determines the current upper-confidence-bound is out of an applicable range according to the upper-confidence-bound information from the UCT searching unit, so as to adjust the decision-making boundary and optimize the upper-confidence-bound for avoiding too many invalid searching processes;

a genetic algorithm (GA) searching unit configured to be driven to perform a genetic-algorithm computing process for a neural network composed of a variety of topological structures, so as to group neuron nodes of the neural network to determine a target group, thereafter to perform a tree-structured data searching process on the target group, so that the tree-searching module can effectively simplify the searching scope;

a Monte Carlo tree searching unit configured to be driven to perform an MCTS process for a neural network composed of a tree-structured topology with a large depth, so that the tree-searching module is enabled to enhance the tree-searching performance through heuristic-searching processes, for reducing cost of paths;

a searching-schedule accelerating unit configured to be driven to perform a B+tree searching process in a file system embedded with B+tree file structure, for a neural network composed of a tree-structured topology with a large width, so that the tree-searching module is enabled to perform the searching schedule with B+tree searching algorithm, which facilitates effective saving of the search time; and a hash-table searching unit configured to be driven to store indexes in a hash table and is configured to perform an index-searching process with hash-searching algorithm, for a neural network composed of a tree-structured topology with a large number of indexes, so that the tree-searching module can effectively save search time.

11. The artificial-intelligence decision-making core system with neural network according to claim 1 or 3, wherein the system tuning module of the residual-backpropagation sub-system further comprises:

a residual analysis unit, with more than one residual computing program, wherein the residual analysis unit is configured to perform an applicable residual computing program according to the non-linear analyzed data imported by the progressive backpropagation input module to generate a residual analysis data;

a self-tuning processing unit for performing a self-tuning processing program based on the non-linear analyzed data and the residual analysis data, with an adaptive residual analysis for a backpropagation of residual compensation, to derive a system tuning information, wherein the system tuning information is for fine-tuning the neural network or for triggering a training-break mechanism;

a state register unit wherein the system tuning module is configured to store more than one break-configuration switching data in the state register unit according to the system-state data; and a training breaker unit for determining whether a training-break condition is met according to the system tuning information from the self-tuning processing unit, wherein the training breaker unit works with the state register unit if the training-break condition is met, to generate a training-breaker information according to a selected break-configuration switching data, so that the residual-backpropagation sub-system is configured to further coordinate the neuro-computing sub-system to perform a training-break mechanism according to the training-breaker information.

12. The artificial-intelligence decision-making core system with neural network according to claim 2 or 4, wherein in order to enhance the management for training states and system tuning information, the system tuning module of the residual-backpropagation sub-system further comprises:

a state recovery unit for a system that has already performed a training-break mechanism, wherein if the factor that caused the training-break has been eliminated, the state recovery unit will be driven to facilitate the system to restore a normal state which is before the training-break mechanism is triggered, according to the break-configuration switching data stored in the state register unit;

a state switching unit configured to be driven to perform a state switching process according to the break-configuration switching data stored in the state register unit if the current decision-making result is more degraded than the previous decision-making result or there are multiple types of raw data that must be switched, so as to facilitate the system to switch to a previous state which is more applicable;

a data encoding unit which is optional to couple a data compressing unit, for enhancing the confidentiality of the data delivered to the neuro-computing sub-system, wherein the data encoding unit is driven by the residual-backpropagation sub-system to perform an encoding process on the data delivered to the neuro-computing sub-system such as system tuning information, residual-feedback data or training-breaker information, so as to reduce the risk of leaking sensitive information in public network environment during the data transmission cross sub-systems;

a state deletion unit configured to be driven to perform a deletion process for required specific system state to avoid the leakage of the parameters related to important training states in an event of system intrusion, so as to reduce the risk of leaking sensitive information;

a visualized monitoring unit configured to be driven to perform a visualized interface process on a specific monitor device for providing a system administrator a remote monitoring mechanism;

a data compressing unit configured to be driven to perform a data compressing process on an output data to facilitate the transmission for system tuning information, residual-feedback data or training-breaker information between different modules through different devices, so as to enhance efficiency of bandwidth utilization between different transmission devices; and a history tracing unit configured to be driven to perform a history tracing mechanism for data stream in transmission to enhance data security and avoid a large number of repeated decision-making processes, so that the system tuning module is enabled to find out abnormal transmission data via reviewing history logs.

* * * * *